(12) United States Patent
Wilson et al.

(10) Patent No.: US 8,909,583 B2
(45) Date of Patent: Dec. 9, 2014

(54) SYSTEMS AND METHODS FOR PROVIDING RECOMMENDATIONS BASED ON COLLABORATIVE AND/OR CONTENT-BASED NODAL INTERRELATIONSHIPS

(71) Applicant: Nara Logics, Inc., Cambridge, MA (US)

(72) Inventors: Nathan R. Wilson, Cambridge, MA (US); Emily A. Hueske, Cambridge, MA (US); Thomas C. Copeman, Boston, MA (US)

(73) Assignee: Nara Logics, Inc., Cambridge, MA (US)

( * ) Notice: Subject to any disclaimer, the term of this patent is extended or adjusted under 35 U.S.C. 154(b) by 0 days.

(21) Appl. No.: 14/267,464

(22) Filed: May 1, 2014

(65) Prior Publication Data

US 2014/0244562 A1   Aug. 28, 2014

Related U.S. Application Data

(63) Continuation of application No. 13/919,301, filed on Jun. 17, 2013, now Pat. No. 8,756,187, which is a continuation of application No. 13/416,945, filed on Mar. 9, 2012, now Pat. No. 8,515,893, which is a continuation of application No. 13/247,289, filed on Sep. 28, 2011, now Pat. No. 8,170,971.

(51) Int. Cl.
*G06N 5/02* (2006.01)
*G06Q 30/02* (2012.01)

(52) U.S. Cl.
CPC ............... *G06N 5/022* (2013.01); *G06Q 30/02* (2013.01)
USPC ............................................................ 706/46

(58) Field of Classification Search
CPC .............. G06Q 30/02; G06Q 30/0631; G06Q 30/0201; G06Q 30/0251–30/0269
See application file for complete search history.

(56) References Cited

U.S. PATENT DOCUMENTS

| 5,819,245 A | 10/1998 | Peterson et al. |
| 6,012,051 A | 1/2000 | Sammon, Jr. et al. |

(Continued)

FOREIGN PATENT DOCUMENTS

| EP | 2207348 A2 | 1/2009 |
| WO | WO0039725 A2 | 7/2000 |

(Continued)

OTHER PUBLICATIONS

Aciar, Silvana et al.; "Recommender System Based on Consumer Product Reviews"; 2006; IEEE/WIC/ACM International Conference on Web Intelligence; 5 pages.*

(Continued)

*Primary Examiner* — Stanley K Hill
(74) *Attorney, Agent, or Firm* — Oblon, Spivak, McClelland, Maier & Neustadt, L.L.P.

(57) ABSTRACT

In selected embodiments a recommendation generator builds a network of interrelationships between venues, reviewers and users based on their attributes and reviewer and user reviews of the venues. Each interrelationship or link may be positive or negative and may accumulate with other links (or anti-links) to provide nodal links the strength of which are based on commonality of attributes among the linked nodes and/or common preferences that one node, such as a reviewer, expresses for other nodes, such as venues. The links may be first order (based on a direct relationship between, for instance, a reviewer and a venue) or higher order (based on, for instance, the fact that two venue are both liked by a given reviewer). The recommendation engine in certain embodiments determines recommended venues based on user attributes and venue preferences by aggregating the link matrices and determining the venues which are most strongly coupled to the user.

15 Claims, 16 Drawing Sheets

(56) References Cited

U.S. PATENT DOCUMENTS

| | | |
|---|---|---|
| 6,041,311 A | 3/2000 | Chislenko et al. |
| 6,112,186 A | 8/2000 | Bergh et al. |
| 6,247,001 B1 | 6/2001 | Tresp et al. |
| 6,266,668 B1 | 7/2001 | Vanderveldt et al. |
| 6,404,424 B1 | 6/2002 | Davis |
| 6,408,288 B1 | 6/2002 | Ariyoshi |
| 6,412,012 B1 | 6/2002 | Bieganski et al. |
| 6,460,060 B1 | 10/2002 | Maddalozzo, Jr. et al. |
| 6,487,541 B1 | 11/2002 | Aggarwal et al. |
| 6,556,211 B2 | 4/2003 | Davis |
| 6,757,691 B1 | 6/2004 | Welsh et al. |
| 6,775,664 B2 | 8/2004 | Lang et al. |
| 6,782,375 B2 | 8/2004 | Abdel-Moneim et al. |
| 6,865,565 B2 | 3/2005 | Rainsberger et al. |
| 6,988,109 B2 | 1/2006 | Stanley et al. |
| 7,069,256 B1 | 6/2006 | Campos |
| 7,080,052 B2 | 7/2006 | Busche |
| 7,102,067 B2 | 9/2006 | Gang et al. |
| 7,113,917 B2 | 9/2006 | Jacobi et al. |
| 7,155,401 B1 | 12/2006 | Cragun et al. |
| 7,328,216 B2 | 2/2008 | Hofmann et al. |
| 7,366,707 B2 | 4/2008 | De Lacharriere et al. |
| 7,389,201 B2 | 6/2008 | Chickering et al. |
| 7,392,231 B2 | 6/2008 | Basak et al. |
| 7,412,042 B2 | 8/2008 | Henry |
| 7,437,368 B1 | 10/2008 | Kolluri et al. |
| 7,505,962 B2 | 3/2009 | Shariff et al. |
| 7,542,951 B1 | 6/2009 | Chakrabarti et al. |
| 7,584,159 B1 | 9/2009 | Chakrabarti et al. |
| 7,624,095 B2 | 11/2009 | Majumder |
| 7,657,493 B2 | 2/2010 | Meijer et al. |
| 7,657,523 B2 | 2/2010 | Ebanks |
| 7,660,459 B2 | 2/2010 | Busche |
| 7,734,609 B2 | 6/2010 | Manfredi et al. |
| 7,743,067 B2 | 6/2010 | Ducheneaut et al. |
| 7,756,753 B1 | 7/2010 | McFarland |
| 7,792,761 B2 | 9/2010 | Murakami et al. |
| 7,813,965 B1 | 10/2010 | Robinson et al. |
| 7,885,986 B2 | 2/2011 | Anderson et al. |
| 7,890,871 B2 | 2/2011 | Etkin |
| 7,904,530 B2 | 3/2011 | Partridge et al. |
| 7,908,183 B2 | 3/2011 | Jacobi et al. |
| 7,953,673 B2 | 5/2011 | Augusto et al. |
| 7,958,066 B2 | 6/2011 | Pinckney et al. |
| 7,958,079 B2 | 6/2011 | Fogel et al. |
| 7,966,282 B2 | 6/2011 | Pinckney et al. |
| 7,991,841 B2 | 8/2011 | Anderson et al. |
| 7,996,255 B1 | 8/2011 | Shenoy et al. |
| 8,010,470 B2 | 8/2011 | Jackson |
| 8,019,707 B2 | 9/2011 | Shani et al. |
| 8,019,743 B2 | 9/2011 | Ebanks |
| 8,032,425 B2 | 10/2011 | Yi |
| 8,032,480 B2 | 10/2011 | Pinckney et al. |
| 8,032,481 B2 | 10/2011 | Pinckney et al. |
| 8,090,625 B2 | 1/2012 | Yi |
| 8,091,032 B2 | 1/2012 | Fischer |
| 8,095,153 B2 | 1/2012 | Jenkins et al. |
| 8,095,432 B1 | 1/2012 | Berman et al. |
| 8,108,414 B2 | 1/2012 | Stackpole |
| 8,108,501 B2 | 1/2012 | Birnie et al. |
| 8,145,661 B1 | 3/2012 | Billman et al. |
| 8,166,013 B2 | 4/2012 | Bandaru et al. |
| 8,170,971 B1 | 5/2012 | Wilson et al. |
| 8,185,487 B2 | 5/2012 | Tuzhilin et al. |
| 8,234,150 B1 | 7/2012 | Pickton et al. |
| 8,234,151 B1 | 7/2012 | Pickton et al. |
| 8,234,688 B2 | 7/2012 | Grandison et al. |
| 8,244,721 B2 | 8/2012 | Morris et al. |
| 8,249,941 B2 | 8/2012 | Saul et al. |
| 8,250,096 B2 | 8/2012 | Su et al. |
| 8,271,352 B2 | 9/2012 | Lifson |
| 8,290,964 B1 | 10/2012 | Guha |
| 8,315,953 B1 | 11/2012 | Hansen et al. |
| 8,316,000 B2 | 11/2012 | Srivastava et al. |
| 8,333,316 B2 | 12/2012 | Heath et al. |
| 8,341,111 B2 | 12/2012 | Patil et al. |
| 8,364,528 B2 | 1/2013 | Selinger et al. |
| 8,380,639 B2 | 2/2013 | Aleong et al. |
| 8,386,406 B2 | 2/2013 | Bolivar et al. |
| 8,417,698 B2 | 4/2013 | Yoo |
| 8,423,323 B2 | 4/2013 | Bonabeau |
| 8,429,106 B2 | 4/2013 | Downs et al. |
| 8,429,160 B2 | 4/2013 | Osann |
| 8,442,891 B2 | 5/2013 | Mendelsohn |
| 8,447,760 B1 | 5/2013 | Tong et al. |
| 8,452,865 B1 | 5/2013 | Heller et al. |
| 8,468,155 B2 | 6/2013 | Sureka |
| 8,484,142 B2 | 7/2013 | Pinckney et al. |
| 8,484,226 B2 | 7/2013 | Elliott-Mccrea et al. |
| 8,489,515 B2 | 7/2013 | Mathur |
| 8,489,527 B2 | 7/2013 | Van Coppenolle et al. |
| 8,494,897 B1 | 7/2013 | Dawson |
| 8,494,946 B2 | 7/2013 | Lortscher, Jr. |
| 8,515,893 B2 | 8/2013 | Wilson et al. |
| 8,539,359 B2 | 9/2013 | Rapaport et al. |
| RE44,559 E | 10/2013 | Flinn et al. |
| 8,583,524 B2 | 11/2013 | Selinger et al. |
| 8,612,134 B2 | 12/2013 | Zheng et al. |
| 8,620,822 B2 | 12/2013 | Wiseman et al. |
| 8,621,563 B2 | 12/2013 | Sathish |
| 8,635,167 B2 | 1/2014 | Buckwalter et al. |
| 8,644,688 B2 | 2/2014 | Fishman et al. |
| 8,661,050 B2 | 2/2014 | Varshavsky et al. |
| 8,666,844 B2 | 3/2014 | Shaya et al. |
| 8,732,101 B1 | 5/2014 | Wilson et al. |
| 2002/0055890 A1 | 5/2002 | Foley |
| 2002/0116458 A1 | 8/2002 | Bricklin et al. |
| 2003/0025694 A1 | 2/2003 | Davis |
| 2003/0061607 A1 | 3/2003 | Hunter et al. |
| 2004/0044677 A1 | 3/2004 | Huper-Graff et al. |
| 2004/0172267 A1 | 9/2004 | Patel et al. |
| 2005/0120052 A1 | 6/2005 | Miller et al. |
| 2005/0243784 A1 | 11/2005 | Fitzgerald et al. |
| 2006/0106655 A1 | 5/2006 | Lettovsky et al. |
| 2006/0229932 A1 | 10/2006 | Zollo et al. |
| 2007/0060114 A1 | 3/2007 | Ramer et al. |
| 2007/0244747 A1 | 10/2007 | Nikovski |
| 2008/0010258 A1 | 1/2008 | Sureka |
| 2008/0045236 A1 | 2/2008 | Nahon et al. |
| 2008/0059284 A1 | 3/2008 | Solotorevsky et al. |
| 2008/0059455 A1 | 3/2008 | Canoy et al. |
| 2008/0097821 A1 | 4/2008 | Chickering et al. |
| 2008/0183678 A1 | 7/2008 | Weston et al. |
| 2008/0214204 A1 | 9/2008 | Ramer et al. |
| 2008/0215610 A1 | 9/2008 | De Lacharriere et al. |
| 2008/0222064 A1 | 9/2008 | Larimer |
| 2008/0319935 A1 | 12/2008 | Chandak |
| 2009/0106040 A1 | 4/2009 | Jones |
| 2009/0210246 A1 | 8/2009 | Patel et al. |
| 2009/0210475 A1 | 8/2009 | Gadanho et al. |
| 2009/0216563 A1 | 8/2009 | Sandoval et al. |
| 2009/0216626 A1 | 8/2009 | Lund |
| 2009/0222322 A1 | 9/2009 | Andersen et al. |
| 2009/0234876 A1 | 9/2009 | Schigel et al. |
| 2009/0240676 A1 | 9/2009 | Gruen et al. |
| 2009/0287687 A1 | 11/2009 | Martire et al. |
| 2009/0300008 A1 | 12/2009 | Hangartner et al. |
| 2009/0307238 A1 | 12/2009 | Sanguinetti et al. |
| 2009/0327181 A1 | 12/2009 | Lee et al. |
| 2010/0030569 A1 | 2/2010 | Okano et al. |
| 2010/0030578 A1 | 2/2010 | Siddique et al. |
| 2010/0058224 A1 | 3/2010 | Chai et al. |
| 2010/0076968 A1 | 3/2010 | Boyns et al. |
| 2010/0082516 A1 | 4/2010 | Basu et al. |
| 2010/0088649 A1 | 4/2010 | Kemp |
| 2010/0145770 A1 | 6/2010 | Hanson et al. |
| 2010/0145771 A1 | 6/2010 | Figler et al. |
| 2010/0169160 A1 | 7/2010 | Wu et al. |
| 2010/0210364 A1 | 8/2010 | York et al. |
| 2010/0217730 A1 | 8/2010 | Zhao et al. |
| 2010/0223093 A1 | 9/2010 | Hubbard |
| 2010/0250337 A1 | 9/2010 | Kassaei |
| 2010/0262556 A1 | 10/2010 | Shaya et al. |
| 2010/0262658 A1 | 10/2010 | Mesnage |

(56) References Cited

U.S. PATENT DOCUMENTS

| | | |
|---|---|---|
| 2010/0268574 A1 | 10/2010 | Butcher et al. |
| 2010/0268661 A1 | 10/2010 | Levy et al. |
| 2010/0287282 A1 | 11/2010 | MacLaughlin |
| 2010/0312644 A1 | 12/2010 | Borgs et al. |
| 2010/0312724 A1 | 12/2010 | Pinckney et al. |
| 2010/0325205 A1 | 12/2010 | Murphy et al. |
| 2011/0016001 A1 | 1/2011 | Schieffelin |
| 2011/0071969 A1 | 3/2011 | Doctor et al. |
| 2011/0087661 A1 | 4/2011 | Quick et al. |
| 2011/0099122 A1 | 4/2011 | Bright et al. |
| 2011/0112976 A1 | 5/2011 | Ryan et al. |
| 2011/0153528 A1 | 6/2011 | Bailey et al. |
| 2011/0178839 A1 | 7/2011 | Adra |
| 2011/0201317 A1 | 8/2011 | Karandikar et al. |
| 2011/0207440 A1 | 8/2011 | Ruuspakka et al. |
| 2011/0208822 A1 | 8/2011 | Rathod |
| 2011/0213661 A1 | 9/2011 | Milana et al. |
| 2011/0238608 A1 | 9/2011 | Sathish |
| 2011/0270774 A1 | 11/2011 | Varshavsky et al. |
| 2011/0302117 A1 | 12/2011 | Pinckney et al. |
| 2011/0307327 A1 | 12/2011 | Bixby et al. |
| 2011/0307478 A1 | 12/2011 | Pinckney et al. |
| 2012/0005016 A1 | 1/2012 | Graff |
| 2012/0005201 A1 | 1/2012 | Ebanks |
| 2012/0030198 A1 | 2/2012 | Beck et al. |
| 2012/0066072 A1 | 3/2012 | Kanigsberg et al. |
| 2012/0089328 A1 | 4/2012 | Ellanti et al. |
| 2012/0089623 A1 | 4/2012 | Sobotka et al. |
| 2012/0095862 A1 | 4/2012 | Schiff et al. |
| 2012/0095863 A1 | 4/2012 | Schiff et al. |
| 2012/0109749 A1 | 5/2012 | Subramanian et al. |
| 2012/0130976 A1 | 5/2012 | Cone et al. |
| 2012/0136852 A1 | 5/2012 | Geller |
| 2012/0158720 A1 | 6/2012 | Luan et al. |
| 2012/0166232 A1 | 6/2012 | Neubardt |
| 2012/0166432 A1 | 6/2012 | Tseng |
| 2012/0166960 A1 | 6/2012 | Salles |
| 2012/0173324 A1 | 7/2012 | Vallery et al. |
| 2012/0185262 A1 | 7/2012 | Dalesandro et al. |
| 2012/0185481 A1 | 7/2012 | Björk et al. |
| 2012/0190386 A1 | 7/2012 | Anderson |
| 2012/0303415 A1 | 11/2012 | Edelson |
| 2012/0303569 A1 | 11/2012 | Tuzhilin et al. |
| 2012/0303676 A1 | 11/2012 | Tuzhilin et al. |
| 2012/0323725 A1 | 12/2012 | Johnston et al. |
| 2013/0013595 A1 | 1/2013 | Tseng et al. |
| 2013/0024449 A1 | 1/2013 | Chatterji et al. |
| 2013/0024456 A1 | 1/2013 | Goodson et al. |
| 2013/0024464 A1 | 1/2013 | Berner et al. |
| 2013/0024465 A1 | 1/2013 | Schiff et al. |
| 2013/0024471 A1 | 1/2013 | Mitrovic |
| 2013/0041896 A1 | 2/2013 | Ghani et al. |
| 2013/0054407 A1 | 2/2013 | Sabur |
| 2013/0054662 A1 | 2/2013 | Coimbra |
| 2013/0054698 A1 | 2/2013 | Lee et al. |
| 2013/0060744 A1 | 3/2013 | Roychoudhuri et al. |
| 2013/0066821 A1 | 3/2013 | Moore et al. |
| 2013/0066973 A1 | 3/2013 | Macadaan et al. |
| 2013/0073336 A1 | 3/2013 | Heath |
| 2013/0073422 A1 | 3/2013 | Moore et al. |
| 2013/0073473 A1 | 3/2013 | Heath |
| 2013/0080364 A1 | 3/2013 | Wilson et al. |
| 2013/0085844 A1 | 4/2013 | Nystadt et al. |
| 2013/0103667 A1 | 4/2013 | Minh |
| 2013/0117329 A1 | 5/2013 | Bank et al. |
| 2013/0124449 A1 | 5/2013 | Pinckney et al. |
| 2013/0138512 A1 | 5/2013 | Sandoval et al. |
| 2013/0159826 A1 | 6/2013 | Mason et al. |
| 2013/0173485 A1 | 7/2013 | Ruiz et al. |
| 2013/0198203 A1 | 8/2013 | Bates et al. |
| 2013/0218667 A1 | 8/2013 | Mohamed |
| 2013/0218713 A1 | 8/2013 | Gottfurcht et al. |
| 2013/0268468 A1 | 10/2013 | Vijayaraghavan et al. |
| 2013/0304691 A1 | 11/2013 | Pinckney et al. |
| 2014/0032325 A1 | 1/2014 | Weiss et al. |
| 2014/0058990 A1 | 2/2014 | Benson et al. |
| 2014/0059213 A1 | 2/2014 | Ollikainen et al. |
| 2014/0067901 A1 | 3/2014 | Shaw et al. |
| 2014/0129371 A1 | 5/2014 | Wilson et al. |

FOREIGN PATENT DOCUMENTS

| | | | |
|---|---|---|---|
| WO | WO0133410 | A2 | 5/2001 |
| WO | WO0137193 | A1 | 5/2001 |
| WO | WO0297701 | A1 | 12/2002 |
| WO | WO2009111211 | A2 | 9/2009 |
| WO | WO2013049829 | A1 | 4/2013 |

OTHER PUBLICATIONS

ISR issued Feb. 12, 2014 in PCT/US13/57136, filed Aug. 28, 2013.

Written Opinion issued Feb. 12, 2014, in PCT/US13/57136, filed Aug. 28, 2013.

ISR issued Dec. 17, 2012 in PCT/US12/57780.

Written Opinion issued in PCT/US12/57780 on Dec. 17, 2012.

Yu, Shijun., Contextualized and Personalized Location-based Services. BSc in Computer Science and Technology, Norther Jiaotong University, Chine et de nationalite chinoise, 2008.

"Elements of Artificial Neural Networks", Mehrotra, 1998 MIT Press.

Koren, Yehuda et al.; "Matrix Factorization Techniques for Recommender Systems"; 2009; IEEE; pp. 30-37.

Koren, Yehuda et al.; "Collaborative Filtering with Temporal Dynamics"; 2010; ACM; Communications of the ACM, vol. 53, No. 4; pp. 89-97.

Ricci, Francesco et al.; "Recommender Systems Handbook"; Oct. 29, 2010; Springer; 847 pages.

O'Dell, "Google Unveils Hotpot, a Recommendation Engine for Places," Mashable, Nov. 16, 2010, http://mashable.com/2010/11/15/google-hotpot/.3pp.

U.S. Appl. No. 13/842,165, filed Mar. 15, 2013, Wilson et al.

U.S. Appl. No. 14/255,712, filed Apr. 17, 2014, Wilson et al.

* cited by examiner

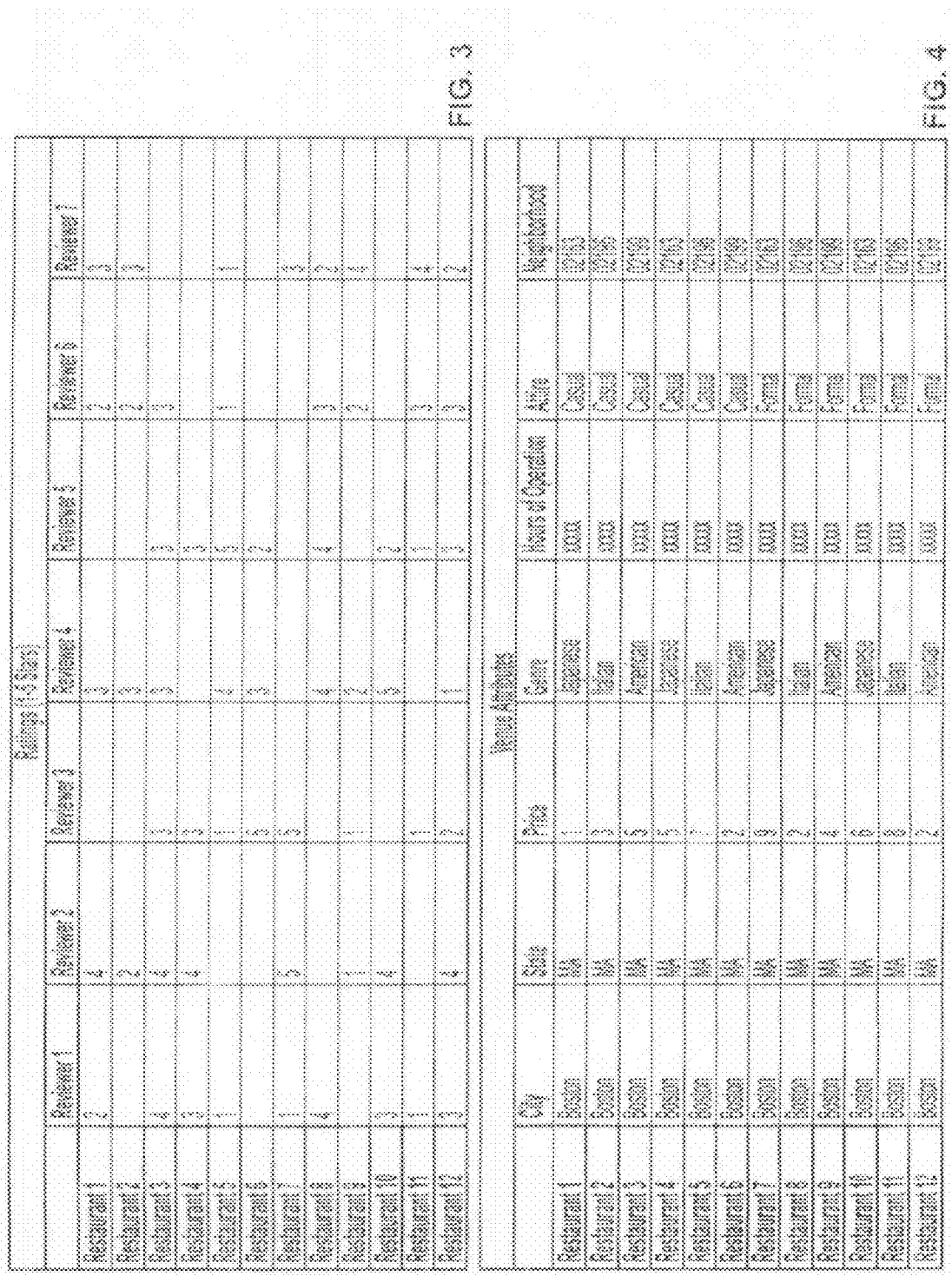

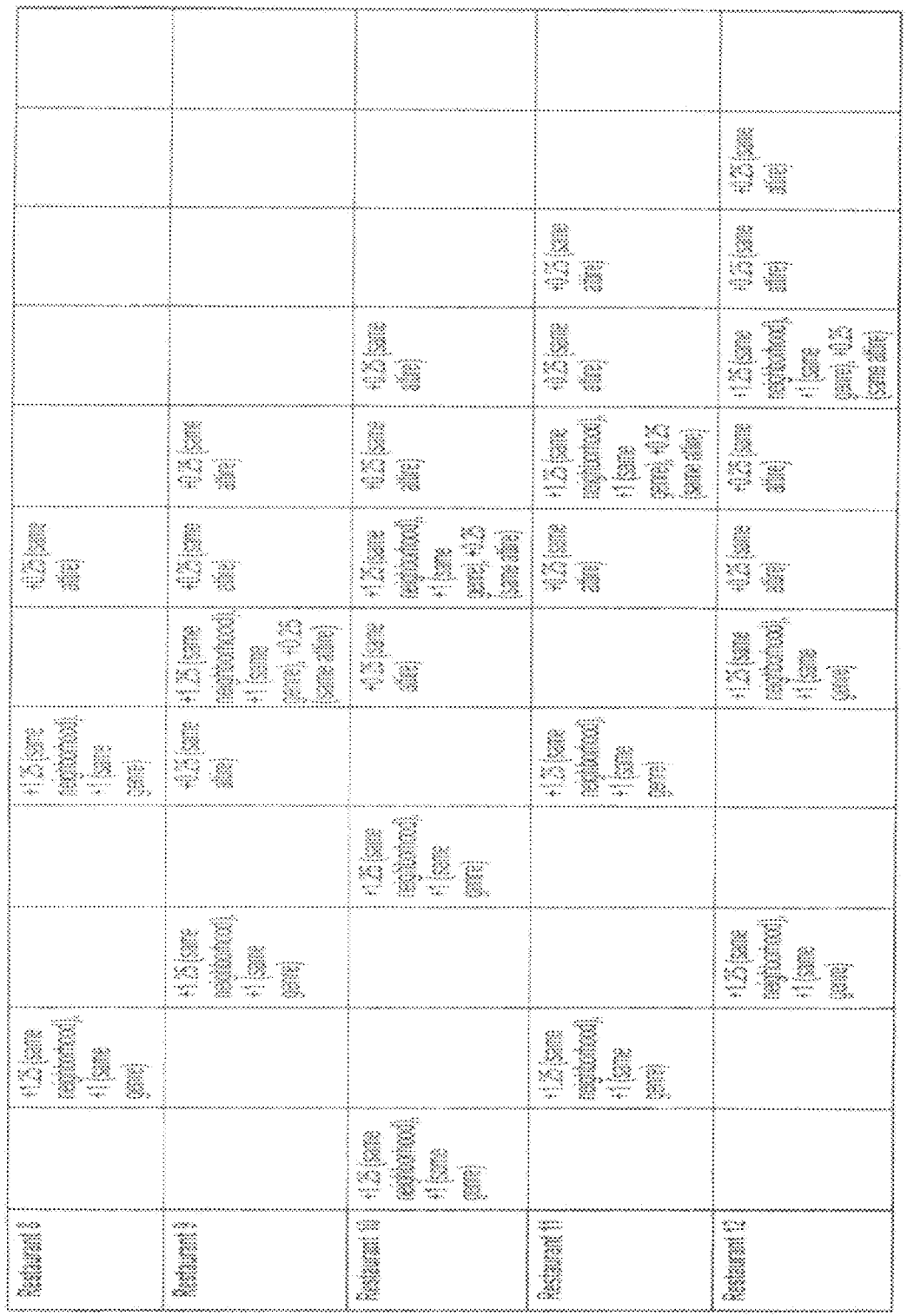

Recommendation Generation for American Restaurant based on User Affinity for Restaurant 7

| | Content-based link strength 901 | Weighting factor 902 | Collaborative link strength 903 | Weighting factor 904 | Content - collaborative link strength 905 | Weighting factor 906 | Overall link strength 907 |
|---|---|---|---|---|---|---|---|
| Restaurant 3 | 0 | 0.35 | 0.25 | 0.4 | 0.5 | 0.25 | 0.225 |
| Restaurant 6 | 0 | 0.35 | 1.5 | 0.4 | 0.7 | 0.25 | 0.775 |
| Restaurant 9 | 0.25 | 0.35 | 1 | 0.4 | 0.4 | 0.25 | 0.2125 |
| Restaurant 12 | 0.25 | 0.35 | 1.25 | 0.4 | 0.8 | 0.25 | 0.7875 |

SYSTEMS AND METHODS FOR PROVIDING RECOMMENDATIONS BASED ON COLLABORATIVE AND/OR CONTENT-BASED NODAL INTERRELATIONSHIPS

CROSS-REFERENCE TO RELATED APPLICATIONS

The present application is a continuation of U.S. application Ser. No. 13/919,301, filed Jun. 17, 2013, which is a continuation of U.S. application Ser. No. 13/416,945, filed Mar. 9, 2012, now U.S. Pat. No. 8,515,893, which is a continuation of U.S. application Ser. No. 13/247,289 filed on Sep. 28, 2011, now U.S. Pat. No. 8,170,971, the entire contents of each of which are incorporated herein by reference.

BACKGROUND

Search engines may output lists of hyperlinks for web pages that include information of interest. Some search engines base the determination of corresponding hyperlinks on a search query entered by the user. The goal of the search engine is to return links for high quality, relevant sites based on the search query. Most commonly, search engines accomplish this by matching the terms in the search query to a database of stored web pages or web page content. Web pages that include the terms in the search query are considered "hits" and are included in the list of hyperlinks presented to the user.

To increase efficacy of the search, a search engine may rank the list of hits or hyperlinks according to the relevance or quality. For example, the search engine may assign a grade or rank to each hit, and the score may be assigned to correspond to the relevance or importance of the web page. Conventional methods of determining importance or relevance are based on the content of each web page including the link structure of the web page.

Many conventional search engines utilize an indexing system for identifying web pages available on the Internet. The indexing system identifies words in the pages and creates an index of those words. The system responds to user queries by analyzing the index and identifying the pages that are most relevant to the users query.

The relevance ranking or determination can be executed in various ways. The citation of one site or page by other sites or pages is sometimes used as one measure of relevance. Web page metadata is also sometimes used in a determination of relevance.

Neural networks have also been used in the field of Internet searching. It is assumed, for purposes of this description, that the reader is familiar with how neural networks operate. A neural network can consist of three basic aspects—a neuron or node, definitions of how the neurons or nodes are interconnected or related to each other, and the manner in which that topology is updated over time.

SUMMARY

In selected embodiments a recommendation generator builds a network of interrelationships among venues, reviewers and users based on their attributes and reviewer and user reviews of the venues. Each interrelationship or link may be positive or negative and may accumulate with other links (or anti-links) to provide nodal links the strength of which are based on commonality of attributes among the linked nodes and/or common preferences that one node, such as a reviewer, expresses for other nodes, such as venues. The links may be first order (based on a direct relationship between, for instance, a reviewer and a venue) or higher order (based on, for instance, the fact that two venue are both liked by a given reviewer). The recommendation engine in certain embodiments determines recommended venues based on user attributes and venue preferences by aggregating the link matrices and determining the venues which are most strongly coupled to the user. The system architecture in various embodiments may permit efficient, localized updating of the neural network in response to alteration of the attributes of various nodes.

The details of one or more implementations are set forth in the accompanying drawing and description below. Other features, objects, and advantages will be apparent from the description and drawings, and from the claims.

BRIEF DESCRIPTION OF FIGURES

FIG. 3 is chart including reviewer ratings according to one example.

FIG. 4 is a chart including venue attributes according to one example.

FIG. 5 is a chart including reviewer attributes according to one example

FIG. 6 is a chart including user attributes according to one example.

FIGS. 7A and 7B show a matrix of content-based venue links according to one example.

FIG. 9 is a chart illustrating a recommendation generation according to one example.

FIG. 11 is a chart illustrating pre-normalization matrix data according to a second example.

Like reference symbols in various drawing indicate like elements.

DETAILED DESCRIPTION OF ILLUSTRATIVE IMPLEMENTATIONS

Overview of Selected Embodiments

Figure 1A:
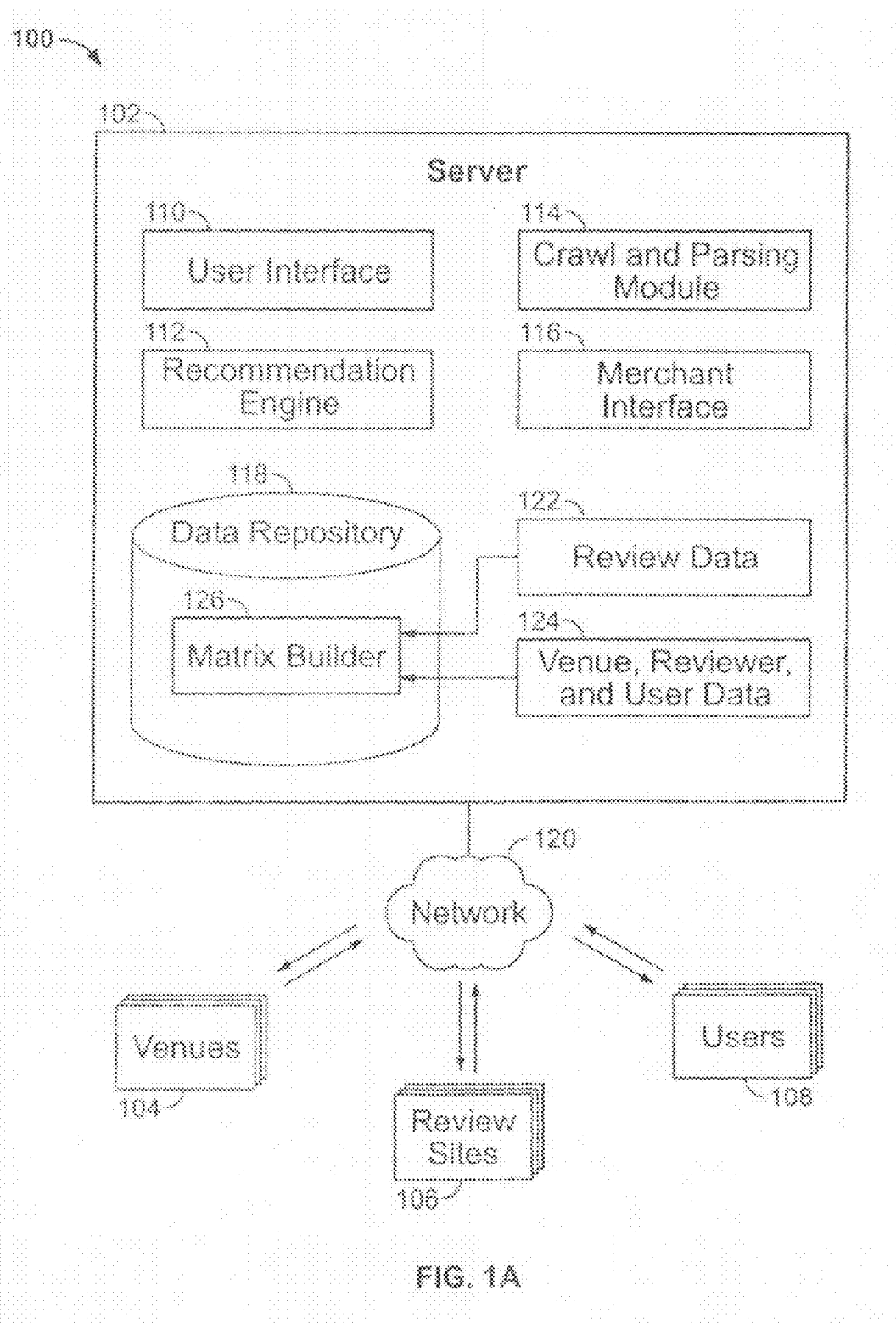
FIG. 1A is a block diagram of an environment for developing and utilizing a network of interrelated nodes.

In certain implementations a recommendation engine may generate recommendations based on attributes and data associated with venues, users, reviewers and reviews. The system may harvest reviews generated by various reviewing entities parse those reviews into an organized database of review data. That data may include attributes of the venue (such as a restaurant) and the rating or assessment provided by the reviewer. The system may also gather or generate data concerning the attributes of reviewer, such as gender, age, profession, marital status, review frequency and review accuracy. The system, in one implementation, also gathers data concerning the attributes of user, such as gender, age, profession, marital status, and affinity (whether positive or negative) for certain venues.

The exemplary system may generate a neural network of interrelationships based on venue attributes and reviewer attributes. For instance, venues may be linked by common features such as price, genre, attire, location, or affinity expressed by the same reviewer. Reviewers may be linked by personal characteristics or common affinities for certain venues. Reviewers and venues may be linked by common attributes of reviewers with a given affinity for a specific venue or common venue attributes for venues liked by a given reviewer.

The system may create interrelationships between and amongst venues and reviewers of different species. For instance, interrelated venues may include restaurants, theaters, events and institutions. Interrelated reviewers may include periodicals and individual reviewers.

Each link may incrementally strengthen or weaken the overall interrelationship between two venues, a venue and a reviewer, or two reviewers. Each link may affect neighboring links, either by causing the neighboring links to strengthen or weaken based on the magnitude of the origin link. When two reference nodes (e.g. venues) are each connect to a common node (e.g., a venue), the system can generate an additional link or interrelationship between the two reference nodes.

The interrelationships can be broadly categorized as collaborative and content-based. Collaborative relationships are a function of affinities expressed by a given reviewer.

Stated another way, collaborative links are usually between things a given user likes, often irrespective of why the user likes them. Content-based relationships are a function of the features held in common among venues in a given subset. Stated another way, content-based links are usually between things within a group which have common features. Hybrids of these approaches may also be used, for example, a link may identify venues among those liked by a given reviewer which have features in common.

The neural network of interrelationships grows dynamically as further review, reviewer and venue data is added. The system may continuously analyze the data to add positive or negative collaborative links, content links, or content-collaborative links. The system may create new derivative links, normalize the data to adjust for data skew, and adjust links based on neighboring link values.

In various implementations the system may generate recommendations based on user attributes and data associated with a recommendation request. The system may provide a plurality of recommendations based overall link strengths that factor in collaborative and content-based interrelationships. The recommendations may include venues complementary to that specifically requested, for instance, in response to a user request for a restaurant recommendation the system may generate a theater or night club recommendation as well.

Exemplary System Architecture

FIG. 1 illustrates an exemplary network architecture for a server-based recommendation generation system 100. It will be understood that some or all of the functionality described herein may be relocated to a client device application (such as a smart phone application) based on the client device's communication, data storage and computational capabilities.

The server 102 hosts a plurality of engines and modules. In this application the user interface module 110 resides on the server 102 and serves web pages or suitable content to a client side application. The crawl and parsing module 114 executes the web crawling and source data collection operations described below. The recommendation engine 112 accesses the matrices of interrelationships and generates the recommendations according to the techniques described herein. The merchant interface provides the functionality describe below concerning venue operators' interaction with the server and accessing projections and reports generated thereby.

The data repository 118 stores the matrices of interrelationships. The repository includes a matrix builder 126 which builds the data structures reflecting the nodal interrelationships based on review data 122 which is collected from review sites 106 by the crawl and parsing module 114. The matrix builder also incorporates venue, reviewer and user data 124 collected from users 108, venues 104 and other web pages (by the crawl and parsing module 114).

The network 120 includes in certain embodiments the Internet or world-wide web. The network may also comprise proprietary and semi-propriety networks such as cellular data networks, intranets, VPNs, or extranets.

Those skilled in the art will understand that the techniques described herein may be implemented in various system and database topologies and consistent with various computational methodologies. Topologies and methodologies suitable for aspects of various embodiments are described in K. R. Nichols, A Reconfigurable Computing Architecture for Implementing Artificial Neural Networks on FPGA, Master's Thesis, The University of Guelph, December 2003; F. Rosenblati, The Perception: A Probabilistic Model For Information Storage And Organization In The Brain, Psycho!, Rev., 65(6): 386-408, 1958; K. Steinbuch and U. A. W. Piske; Learning Matrices and their Applications. IEEE Trans. Electron. Computers; 12:846-862, 1963; J. A Bamden, High-level Reasoning, Computational Challenges for Connectionism, and the Composit solution. Appl. Intell., 5(2):103-135, April 1995; B. Denby, P. Garcia, B. Granado, C. Kiesling, J. C. Prevotet and A. Wassatch, Fast Triggering in High Energy Physics Experiments Using Hardware Neural Networks, IEEE Trans. On Neural Networks, 14(5):1010-1027, September 2003; R. 0. Duda, P. E. Hart, and D. G. Stork. Pattern Classification. John Wiley & Sons, New York, 2nd edition, 2001; H. Eichenbaum, The Cognitive Neuroscience of Memory: An Introduction, Oxford University Press, New York, 2002; K. Fukushima, Cognitron: A Self-Organizing Multilayered Neural Network, Biol. Cybern, 20(3-4): 127-136, 5 Nov. 1975; K. Fukushima and S. Miyake. A Self-Organizing Neural Network With A Function Of Associative Memory: Feedback Type Cognitron, Biol. Cybern., 28(4):201-208, 3 Mar. 1978; J. M. Fuster. Cortex and Mind: Unifying Cognition. Oxford University Press, New York, 2002; R. Gadea, J. Cerda, F. Ballesterand A. Mocholi, Artificial Neural Network Implementation On A Single FPGA Of A Pipelined On-Line Backpropagation, ISSS 2000, Madrid, Spain, September 2000; S. Grossberg, Adaptive Pattern Classification And Universal Recoding: I. Parallel Development And Coding Of Neural Feature Detectors. Biol. Cybern., 23(3):121-134, 30 Jul. 1976; S. Grossberg, Adaptive Pattern Classification And Universal Recoding: IL Feedback, Expectation, Olfaction, Illusions, Biol. Cybern., 23(4):187-202, 30 Aug. 1976; S. Haykin. Neural Networks: A Comprehensive Foundation. Prentice Hall, Upper Saddle River, N.J., 2nd edition, 1999; R. Hecht-Nielsen, Neurocomputing, Addison Wesley, Reading, Mass., 1989; R. Hecht-Nielsen, A Theory Of Thalamocortex, in R. Hecht-Nielsen and T. McKenna, editors, Computational Model!. for Neuroscience: Human Cortical Information; S.Y. Kung, M. W. and S. H. Lin., Biometric Authentication: A Machine Learning Approach. Prentice Hall PTR, Upper Saddle River, N.J., 2005; B. Widrow and M. Kamenetsky, On The Efficiency Of Adaptive Algorithms, In S. Haykin and B. Widrow, editors, Least-Mean-Square Adaptive Filters, John Wiley & Sons, New York, 2003; B. Widrow and M. Kamenetsky, Statistical Efficiency Of Adaptive Algorithms, Neural Netw., 16(5-6):735-744, June-July 2003; B. Widrow and M. A. Lehr, 30 Years Of Adaptive Neural Networks: Perception, Madaline, and backpropagation, Proc. IEEE, 78(9):1415-1442, September 1990; U.S. Pat. No. 7,840,569, entitled "Enterprise relevancy ranking using a neural network," which is incorporated herein by reference; U.S. Pat. No. 7,895,140, entitled "Neural Network Learning Device, Method, And Program," which is incorporated herein by reference; and U.S. Pat. No. 7,979,370, entitled "Neural Network For Electronic Search Applications," which is incorporated herein by reference.

Node/Venue Types

The nodes in the neural network in one implementation are venues such as restaurants, theaters, night clubs, hotels, concerts and other events. However, due to the flexibility of the systems and methodologies described herein they may be applied in a variety of other manners. Nodes in the network may be sub-venue items such as specific mend items or specific rooms inside a hotel. The nodes may also be style consumables such as clothing, furniture or wine or rather content such as music, books, magazines, TV shows, or movies. The nodes are optionally set to be services such as mechanics, barbers, transportation, doctors, dentists, landscape architects, interior designers, or nanny services. In other implementations the nodes may neighborhoods or cities in which to live, colleges to apply to, careers that are a good fit, or grocery stores. In still other applications the nodes may be associated with social aspects such as friends and activities the user might like. The nodes in other embodiments are medical conditions or treatments.

The techniques described herein may also be used for fraud detection by providing predictions of what a user is unlikely to do, which in turn is more likely to be associated with fraudulent use of a credit card (for instance). The techniques may also be used for marketing/co-branding opportunities by predicting brand affinity even across disparate categories. The techniques may also be applied to actuarial/risk assessment applications by analyzing co-occurrences between a user's fine-scale likes and dislikes, which can be utilized as indicators of risk. The techniques may also be used to predict financial market behavior or trends by aggregating markets into "group users" and predicting behavior of that group user as described hereinbelow. In a similar vein predictions on mass human behavior can be achieved with respect to geographic movement (migratory patterns) and thereby census and demographic projections over time may be generated for use by retailers, real estate developers, and others. Moreover, the techniques may be used to gauge affinity for certain types of media (such a television shows) or media channels (cable or web).

As will be appreciated from the following description, in each such implementation the nodal attributes, reviewer attributes and the interrelationships will be selected to correspond in part to the factors which are causally associated with reviewer's preferences for certain nodes. For instance, in a system designed to provide career suggestions the nodal attributes may includes skills associated with each profession and user attributes may include aptitude scores or survey questionnaire results.

Hereinbelow the system 100 is described in connection with exemplary systems in which the nodes are venues such as restaurants, hotels or theaters. For convenience the term "venue" is used to refer to neural network nodes. It should be understood that the term "venue" in the following sections is used broadly to refer to any entity or item that is interrelated in the network with other network nodes such as users and/or reviewers.

Identification of Venue Reviews

A user's or reviewer's affinity (again, positive or negative) for a venue is derived from both evaluations and assessments of venues, such as reviews or ratings, and implicit data sources such as ant trails. Individuals may publish ratings on social webpages, review forums and websites or blogs. Ratings may also be published by votes placed via "Like" or "Ding" buttons disposed on various websites. As one example, user reviews of restaurants can be found at menuism.com, dine.com, opentable.com, google.com, reviewsahoy.com, and realeats.com. An individual's affinity for certain venues can also be discerned from their spending habits or purchase history, data of which can be gleaned from financial transaction records such as credit card statements. An individual's web browsing history or ant trail can also provide insight into affinity for certain venues, as discerned from cookies or the various reviews an individual generates across multiple forums, including but not limited to websites associated with each venue. An individual's website navigation bookmarks and browsing history also reflect browsing behavior and may likewise be mined for source data. The geographic position of an individual over time, such as derived from cellular GPS data, can likewise be correlated with venues and thereby generate data reflective of venue affinity. This approach may provide dwell time data as well, which can be used to sort or arrange the data. Magazine subscriptions information may also be used as indicators of an individual's affinity for given venues (as that term is broadly used herein). An individual's professional licenses can also be used as data sources for affinity for venues, including but not limited to organizations.

The foregoing sources of data concerning venue affinity can be prioritized based on factors germane to the strength of the correlation between the data and the affinity of interest. Data or sites that refer to a greater number of venues might be more probative since such sites are more likely to compare, contrast or rank venues. Similarly, sites that specify a greater number of properties, such as in structured fields, for each venue or reviewer tend to be more effective or probative. Sites with a greater number of reviews per venue and/or reviews per reviewer are, on balance, to include more reliable affinity, The inclusion of "related items," "also viewed," or "people who purchased this also purchased" fields or boxes can also be considered as indicators that the site's data will be strongly correlated to actual affinities. In a similar vein, a site's inclusion of geographically proximate recommendations, recommendations based on social networking, and recommendations based of complementary venues (e.g. hotel and restaurant) may be indicative of more reliable data. The behavior of the more effective or accurate reviewers also can be analyzed to differentiate various data sources, for example, by determining where those reviewers tend to post reviews. The existence of grouping structures, such as data structures associated with a plurality of socially networked individuals, can also be used as a metric to grade or rate the potential value of the site's data. Blogs may also be crawled to determine which reviews or ratings sites are the most commonly referenced.

In one embodiment, numeric values are associated with some or all of the foregoing variables and weights are assigned to each variable based on the system designer's estimation of the relative strength of correlation between the variable and the predictive value of the review data on the site. For instance, the density of the best reviewers on a site may be weighted more heavily than the number of venues referenced on a site. The resulted weighted numerical grades can be used to prioritize harvesting operations.

Harvesting Venue Reviews and Reviewer Data

The reviews may be harvested using web crawling techniques such as those described in U.S. Pat. No. 6,631,369, entitled "Method and System for Incremental Web Crawling" and assigned to IBM Corporation, which is incorporated herein by reference. According to that technique, in an initial crawl, the crawler creates a first full index for the document store after which incremental crawls are executed.

Alternatively or in addition, the system 100 may target cached web pages served by commercial search engines. A suitable protocol for rebuilding content sites from search engine caches is as follows. First, a complete venue listing for a category by crawling a directory such as a Yellow Pages or other suitable directory. For each item in the directory, the system 100 runs a series of search queries in various search engines, each query restricted to results for the content site of interest, such as dine.com. The search results are parsed and the URLs for the relevant cached pages are retrieved. The cached pages are then retrieved and in a repository, after which they are parsed based on the name, city, phone number, and other data fields associated with a venue of interest. In this manner the cached review page for the venue of interest may be identified. This process is optionally repeated across search engines and across multiple venues, targeting the sites prioritized as set forth in the preceding section, to collect the desired array of source data.

The data may optionally be validated by checking parsed venue or reviewer content for blank fields. Venue or reviewer content may also be checked against unique identification information (a venue phone number or a reviewer email address or screen name) to ensure sure that it corresponds to the target venue or reviewer.

After validation, the pages may be parsed to extract the data of interest. Parser code may be used to segregate out the structured fields of interest, the reviews, and other information of interest as described above. The extracted data may be upload the data in database tables or files to be analyzed for computing personalization. Techniques such, as those taught in U.S. Pat. No. 7,788,293, entitled "Generating Structured Information" assigned to Google Inc., the contents of which are herein incorporated by reference, may be used for this purpose.

The same approaches can be used to harvest data concerning reviewers or users (discussed in more detail below). The data is preferentially in a structured format on a public site and is predictive of personality and affinities. The data sources may be prioritized or ranked as set forth in the preceding section, such as according to the number of reviews, given by the reviewer, the citation of a reviewer's reviews on other sites and the alignment of a reviewer's reviews with overall ratings generated by the system 100 (as discussed below) and third party review sites from which data is harvested. The reviewer data is then selectively crawled and parsed as explained above.

The crawl and parser module 114 may be configured to coordinate the crawling and digestion of certain web or network nodes. Due to practical limitations the entire World Wide Web cannot be crawled and parsed simultaneously. The crawling and parsing process may be coordinated across different content-gathering computers or agents. Multiple remote crawling engines (at remote network nodes) may be deployed, each of which can check data sources (such as web pages or cached web pages) for the properties described above and recruit crawling and parsing nodes in the event rich data sources are located. The remote crawling nodes can coordinate their crawling based on real-time breaking news events, or optimize content gathering in response to shifts in mass user behavior as reflected in the data matrices described herein.

Figure 1B:
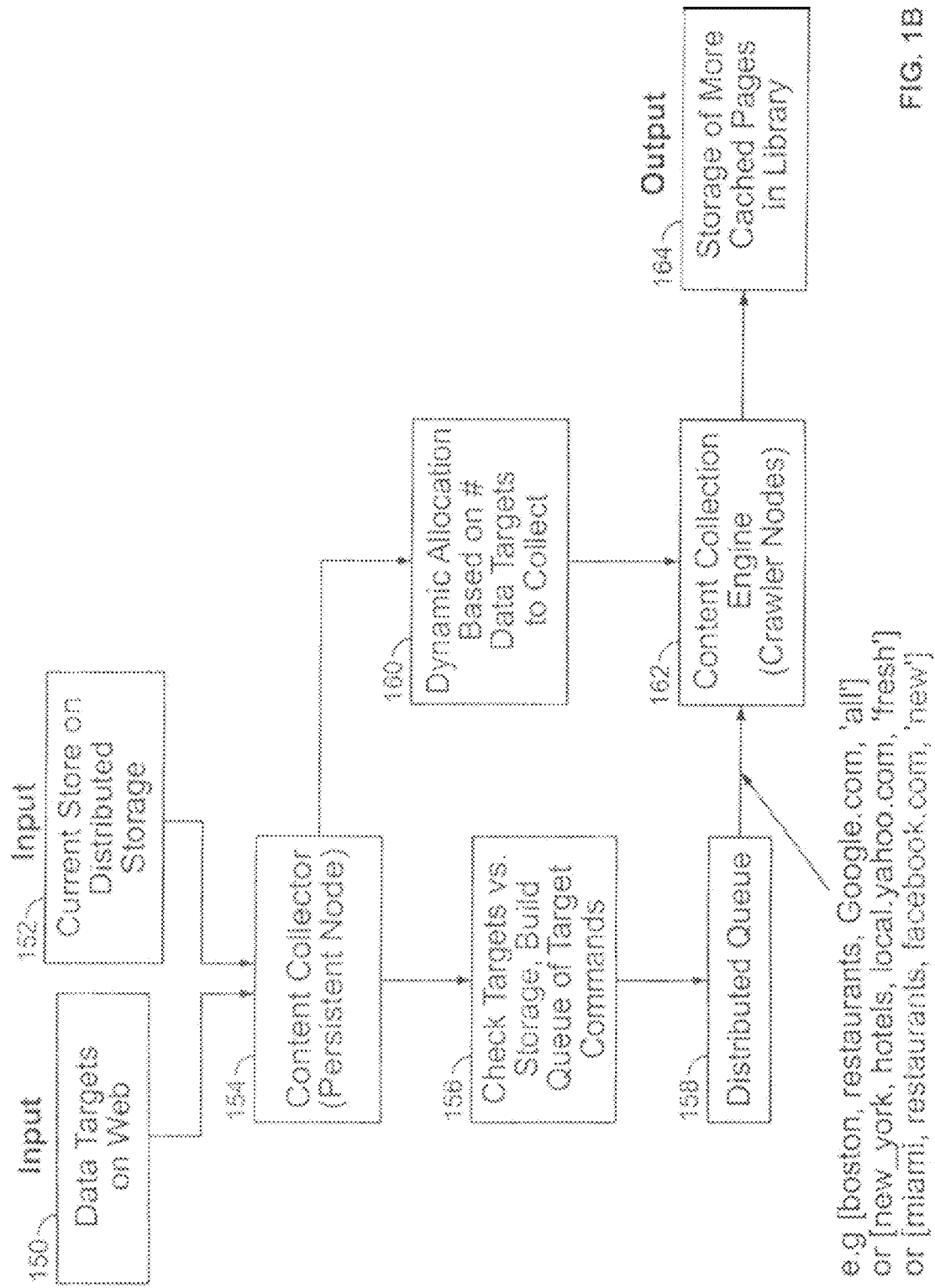
FIG. 1B is a diagram of a process flow executed by an exemplary content collection system.
Figure 1C:
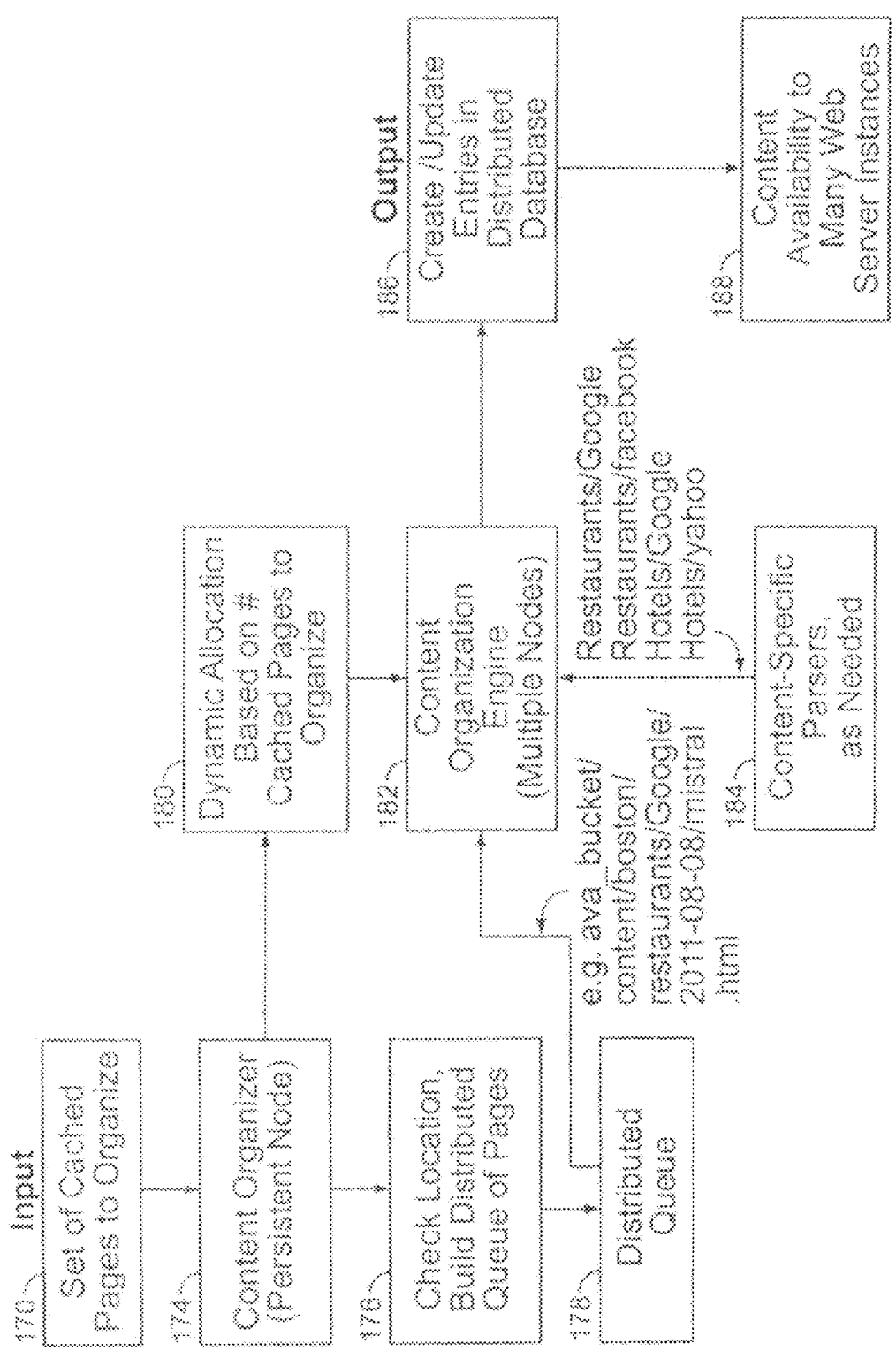
FIG. 1C is a diagram of a process flow executed by an exemplary content organization system.

Examples of content collection and content organization systems and process flows are shown in FIGS. 1B and 1C. FIG. 1B illustrates the process executed by the content collection system, which may include the crawl and parsing module 114. At box 150 the crawl and parsing module 114 identifies subject matter targets, such as rock-climbing, are needed in the neural network. The targets may also take the form of specific URLs or collections thereof. At box 152 the module 114 identifies the current content, in the form of previously collected web pages (or representations thereof), that already resides within the system's storage network. At step 154 the content collector, which in one embodiment takes the form of a persistent system network node, determines from a comparison and analysis of the two inputs which subject matter or URLs are to be gathered by the module 114. The content collector verifies the addresses and content of the target sites containing the subject matter which is to be collected and creates a queue of items to be crawled and parsed by the module 114. As an example, the distributed queue's first entry might be [Boston, restaurants, google.com, 'air] which corresponds to a request that the crawler nodes collect all cached pages associated with google.com's reviews of any Boston area restaurant. The content collector may also dynamically allocate certain queue items to specific crawling nodes based on their relative priority (160). At step 162 the content collection engine, which includes a distributed array of crawler nodes, receives or access the distributed queue and dynamically assigned collection commands from the content collector. The content collection engine, under the control of crawl and parsing module 114, collects cached web pages as discussed above. The output is a library of cached web content which is parsed according to the methods described herein.

FIG. 1C shows an exemplary process executed by the content organizer, which may comprise the matrix builder 116. At step 174 the content organizer receives or accesses the library of cached pages to be parsed and added to the network. The content organizer may be a persistent system network node in various embodiments. The content organization engine (see step 182) may include a distributed array of parsing nodes that access a distributed queue of parsing assignments and receive assignments which are dynamically assigned, optionally to specific crawling nodes or crawling nodes having certain attributes such as bandwidth or throughput. The content organization engine also accesses an array of site-specific parsers which are specially designed to parse data as it is presented on certain sites. For instance, because Google.com may present its hotel data in a format different than restaurants, a parser engine specific to Google's hotel pages is presented to the content organization engine for use in parsing corresponding cached web pages. Other examples, as shown in FIG. 1C include a parser specific to Facebook.com's venue or event pages. This architecture may facilitate modification of parser engines as sites alter the manner in which they present data. For example, Local.yahoo.com may alter the data format of its hotel pages, in response to which a single parser engine can be updated. The output of the content organization engine (182) is used by the matrix builder 114 to create additional nodes and matrices of interrelationships as described herein. The resulting matrices and databases of web content are presented for simultaneous access by multiple instances of web servers which present the user interface described below or which communicate with mobile device client applications as discussed herein.

Collection of User Data

Upon creation of an account or in response to another triggering event such as a request for a new recommendation the system 100 may require a user to input various data including gender, age, marital status, children ages, children gender, third parties with whom the user is socially networked, hobbies, interests, favorite venue information (in one or more venue categories), preferred or non-preferred reviewing entities (if any).

The user is then asked to list favorite or preferred venues. As an example, the user may list favorite restaurants. The system 100 asks for alternative favorites in the event the restaurant is not included within the neural network.

The system 100 optionally may crawl the web for additional information concerning the user and then parse and validate the data according to the methods described above. This supplemental data may be added to the user's profile, data from which will be used in various operations as set forth below.

Creating Nodal Interrelationships

Nodes in the data network represent venues, venue properties, users, user properties, reviewers, reviewer properties, and the like. Links or links represent relations between those nodes. The number of links between two items might therefore grow as data on two items grows. The strength of each link denotes the affinity between the two connected items, such as similarity of star rating (in a review of a venue), number of attributes held in common. Links can be either positive or negative in sign.

Figure 2:
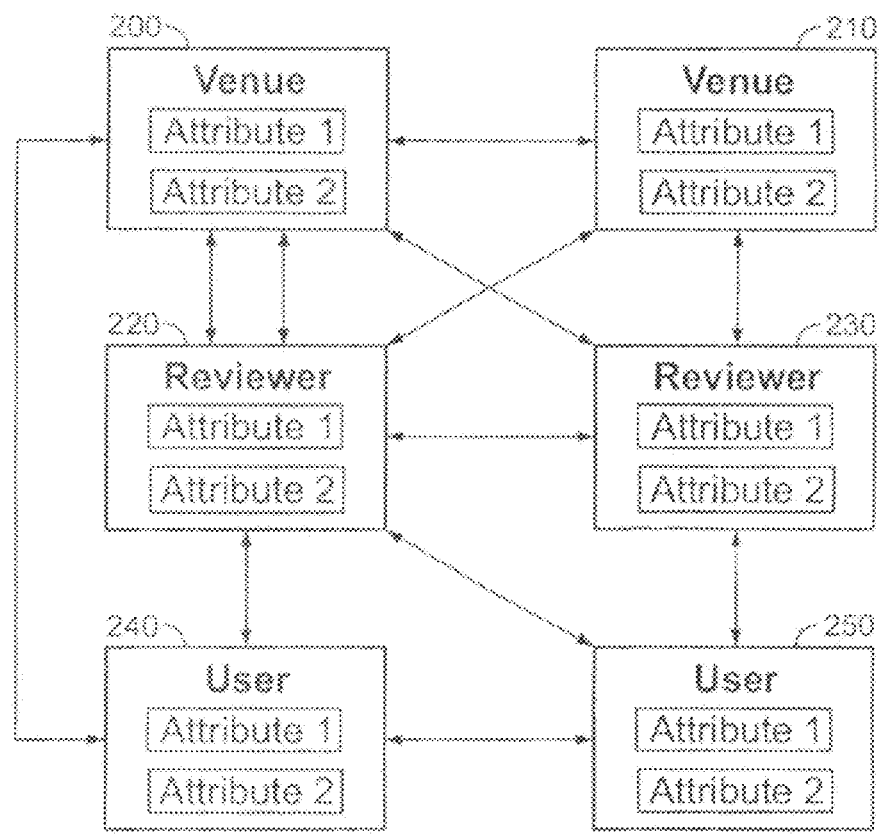
FIG. 2 is a diagram showing the interrelationships between venues, reviewers and users.

Links can be associated to designate affinity between and amongst, venues, properties of venues, users, reviewers, content sources, or any combination thereof. For instance, as shown in FIG. 2, two venues 200, 210 may be interrelated in that they have several attributes 201, 211 in common, namely that they are both Italian restaurants in the same neighborhood. Reviewers 220, 230 are related in that they likewise have multiple attributed in common. Users 240, 250 are likewise interrelated by shared attributes. Reviewer 220 is interrelated with both venues 200 and 210 in that Reviewer delivered a review to both venues and that in turn creates an additional relationship between venues 200 and 210 (namely, they were reviewed by the same reviewer. User 250 is related to both Reviewers 220 and 230 via shared attributes and User 240 is related only to Reviewer 220 via the shared attributes. Reviewers 220 and 230 are thus interrelated also in that they share attributes of user 240. User 240 is also directly linked to venue 200 by virtue of the fact that the user has expressed an affinity for that specific venue. Reviewers 220 and 230 thus have a second order relationship with venue 200 through user 240.

This data architecture permits links, or interrelationships, to be adjusted independently from one another. Links touching the same node can be adjusted for one partner node but not others. Links on the same node can be "scaled" together to maintain relative values of each of their partners while changing the overall drive/influence to that node.

In selected embodiments, subtractive or "anti-related" links can weaken relationships from one node onto another. Subtractive nodes also can be added to the network to normalize the total positive timbre of local nodes where the average link values are too strongly positive. Subtractive nodes also can serve to mediate competition between nodes to influence one another, as the strength of the link dictates the effect one node will have on the other. Subtractive nodes can help sharpen, or focus, the positive influence cast by a given node.

Links can in various implementations be sorted according to priority of influence over (or strength of link to) their downstream node. Links may interact and influence one another, where the addition of one changes the strength or presence of another, in a manner that is restricted or targeted to other links on the same node.

Links from reviewer nodes can be normalized based on how positive or negative they are. In other words, if a given reviewer is an "easy grader" his or her reviews may be lessened in magnitude to normalize the reviews to a statistic goal or mean. Links from reviewer nodes may also be normalized to lessen the influence of those links where, for instance, a reviewer has an extraordinarily high number of reviews (each of which creates a link) and thus that single reviewer's opinion would unduly influence the data network if not scaled appropriately. Conversely, the strength of a reviewer link make by scaled upwards based on measured or perceived effectiveness or accuracy of the reviewer. This may be executed, for instance, through rankings or ratings of reviewers or statistical feedback whereby accuracy or predictiveness of reviewers is measured.

Weighting or normalization may also be used to alter a link's strength based on the number of attributes in held in common. For instance, the system 100 may be configured to give each additional link of a given type a linearly or exponentially decreasing affect, such as where a substantial number of interrelated reviewers given a venue a similar review. Links between nodes which are hyper-connected may be likewise be scaled downward to reduce the effect that one of the two nodes has on the extended network. The converse— giving cumulative links escalating effect or increasing link strength for under-connected nodes—may also be implemented with the opposite effects.

Links may also be weighted based on the predictiveness of the reviewer. For instance, reviewers may be graded based on number of reviews, number of citations on other web sites, or ratings of reviewers on third party sites crawled by the system. The links created based on each reviewer's reviews may accordingly be scaled linearly or non-linearly according to the relative grade of the reviewer. Reviews provided by more highly rated reviewers may be assigned correspondingly higher values or strengths.

Reviewers may be weighted on a user-specific basis as well. For example, the neural network of links may be reweighted based on the fact that the user requesting a recommendation has affinities or attributes held in common with certain reviewers. Reviewers' ratings may be corresponding weighted more heavily or more lightly in correspondence to the link between the user and the various reviewers.

Reviewers may optionally be pruned from the network if they have below a threshold level of relevance as measured by a corresponding grade or effectiveness. As noted elsewhere herein, the grades of reviewers may be based on ratings of reviewers at third party sites and/or feedback of users of the system 100 concerning agreement or disagreement with recommendations which were calculated in part based on a given reviewer's review. If a reviewer is pruned from the system the remaining reviewer's weightings may be adjusted upwards to maintain normalization.

The links in the neural network may be bidirectional (as shown in the figures) or unidirectional. In certain circumstances, the predictiveness of a link may be asymmetrical or unidirectional. For example, it may be the case that almost everyone who likes restaurant A likes restaurant B, but very few who like restaurant B also like restaurant A. In that case the links associated with affinity for restaurant. A may unidirectionally point to (be linked to) restaurant B but the converse would not be true—node B would not have a positive link to restaurant A based on this data point. For simplicity of illustration the figures address the simpler scenario wherein all data points are symmetrical but in various implementations some or all of the links are unidirectional or have asymmetric strengths (such as +1.5 in one direction and +0.5 or −0.5 in the other direction).

The data network may be refined based on an active feedback loop from concerning the effectiveness of the recommendations provided by the system 100. Links can be refined (in either direction) based on feedback for how effective the recommendation was. One measure of the effectiveness of the recommendation is whether funds were spent by the user based on the recommendation, which in turn might be measured via data provided by partners such as financial transaction card issuers. Another measure may be feedback provided by the user in response to a query or survey concerning the recommendation or venue in question. Yet another measure of recommendation effectiveness is a user's browsing behavior and the fact that the user left a positive review for the recommended venue on a third party site [which review is collected and parsed as set forth above). Still another technique to assess effectiveness of a recommendation is geographic dwell time at a physical location associated with a venue as measured by mobile device GPS data, for instance.

It should be noted that not only first order connections are updated based on feedback. Rather, in various implementations second and higher order connections are optionally updated based on feedback. For instance, when a reviewer's ranking or grade is updated the second order connection between two restaurants which are both liked by the reviewer is updated or correspondingly modified as well.

Mismatch between the recommendation and the user's evaluation can drive a reduction or weakening of the links between the associated nodes and the converse could also be executed. In response to positive feedback between a reviewer node's recommendation the links between that node and neighboring nodes may be strengthened. Similarly, links created by the reviewer's reviews may be assigned a greater strength.

The nodal structure facilitates computations and scaling of the network. As will be seen, the nodal network creates a natural look-up table that is convenient to search and operate over. The nodal structure with inter-node links of varying types provides a convenient way to update the structure as new pieces of information are added, and in certain embodiments this is executed without losing the original information as in traditional databases that represent affinity as single number weights between items. The data in various embodiments is represented as either an indexed rows of databases, linked lists, or distributed files.

The matrix of interrelationships or links can be broadly categorized as content-based interrelationships, collaborative interrelationships and content-collaborative interrelationships. The first type, content-based links, are in certain embodiments premised on venue attributes for multiple venues reviewed by same reviewer. The content-based links establish interrelationships between venues based on shared attributes. The strength of the link (or anti-link) is dependent on the number of things held in common, comparative ratings and other factors as described herein.

Collaborative venue interrelationships associate venues that are liked by same reviewer, often without any dependency or relation to the reason(s) why the reviewer likes the venue. The strength of the link (or anti-link) is dependent on reviewer rating, proximity on same list, and other factors described herein. Collaborative links arise when two venues co-occur, for example, in the same person's list of favorite or preferred venues, on the same "top 10" or other grouping lists on ranking or recommendation sites, or on the same search engine search results. Proximity within the list may be used as a variable to control link strength. Ant trails may also be used to create collaborative links by tracking people's surfing behavior and linking venues a given user often visits, independent of spiderwebbing. In this way, restaurant A may be deemed interrelated to museum B if many tracked users visit both of those sites, The user's dwell time at each site or the fact that a user left a rating or review may also factor into whether a link is created. In certain embodiments, this tracking is accomplished without the use of cookies, rather by collecting from the web data concerning the user's activities on rating and review sites according to the techniques described elsewhere herein.

Content-collaborative interrelationships or links arise from common (or anti-common) reviewer attributes for reviewers who liked (or disliked) the same venue. The venue attributes may be analyzed for common or anti-common features and links may be established between either a specific venue and reviewer attributes or between venue attributes and reviewer attributes. The strength of link may depend on the incidence of an attribute among reviewers giving venue a certain grade or similar comparative ratings.

The exemplary architecture illustrated in FIGS. 3-12 facilitates in certain embodiments dynamic updating and adapting of the network. For example, when a new restaurant or review is added to the network, those nodes each create first, second and higher order links which are added to the network. The affected links can be updated by a relatively computationally simple (and non-resource intensive) addition or other arithmetic operation and the neural network need not be substantially entirely recalculated or reformed.

Generating Recommendations

Either the system or users may trigger the recommendation engine. The users may do so by entering through a web portal, client application or electronic message a request that a recommendation be generated based on provided venue attributes such as type, geography or price. The system 100 may access a user profile to collect data from the user profile such as other venues liked, gender, profession, or age. The system 100 may also automatically generate recommendations for inclusion in electronic messages, such as text messages or email messages, sent to targeted users or for presentation on a web portal or client application accessed by users.

The recommendation engine responsively identifies the venues with strongest links according to the following protocols in selected embodiments. Based on the identified "liked venue(s)" the system 100 identifies the top N venues that have strongest link value to that the identified venue and which have the specified venue attributes. Alternatively or in addition, based on highest rated venue(s) having specified attributes the system 100 identifies the top N venues that have strongest link Value to that the identified venue. Still another alternative which can be used alone or in combination with the foregoing is to, based on the highest rates venue(s) having specified attributes and being recommended by friends or selected reviewers, identify the top N venues that have strongest link value to that the identified venue. The recommendation engine may also generate recommendations based on the user's attributes, for instance by identifying the top N venues that have strongest link to user attributes.

In certain embodiments, a plurality of these techniques are used and resulting venue recommendations are weighted based on empirical observations concerning the predictiveness or accuracy of each protocol. The weight factors may be simple coefficients or first, second or higher order equations.

In the case of recommendations provided for a group of users, these same techniques may be used but with the modification that the user attributes are selected to match the group, either by direct user input or by arithmetic blending or averaging the user attribute values to arrive at a composite group user profile.

Recommendations may also be provided based on real-time location information, such as that provided by smartphone GPS data. As described more fully below, the system 100 may send an electronic message or alert either including a recommendation based in part on the location and/or time or prompting the user to access an interface to receive the recommendation. For instance, if a user is known to be proximate to a theater shortly before a show which the recommendation engine ranks highly for that particular user the system 100 may generate an electronic alert to the user including the recommendation, a hyperlink to the system 100 web portal, or a link to active a client recommendation application which can launch the interface described herein.

Alerts or recommendations may be accompanied by, and be generated based on, promotional offers related to the venues. For instance, an electronic notification may contain a recommendation along with a promotional discount offer for the related potential booking or reservation. Recommendations presented in the interface (or via electronic messages) may also be selected based in part on promotional status. That is to say, the recommendation engine may strengthen links nodes associated with promotional offers and thus the engine will factor in promotional offers when determining nodes to recommend (i.e. those most strongly linked to nodes associated with the user or a recommendation request).

Users' feedback concerning recommended venues and the associated "take rates" may likewise be factored in by the recommendation engine. For example, the link strengths may be increased for venues for which users more frequently make reservations based on the recommendations, consistent with the techniques taught herein.

Example

FIGS. 3-12 illustrate one simplified implementation of the recommendation engine described herein. Those skilled in the art will understand that this example can be extended to incorporate any or all of the additional features described herein. Selected of these substitutions and extensions will be mentioned below and those explanations are not intended to be limiting.

FIG. 3 shows an exemplary matrix of reviewer ratings. Reviewer 1 has provided reviews for nine out of the twelve restaurants, the ratings spanning from one star to five, five being the highest. Reviewers 2-7 have likewise each provided ratings for a different subset of the twelve restaurants. In other embodiments the venues could be venues of different types, such as four restaurants, four night clubs and four theaters. The ratings may use a wider numerical or alphabetic scale, integer or non-integer.

FIG. 4 shows the corresponding matrix of attributes for the venues of FIG. 3. In this example each restaurant is in Boston, Mass. and the price varies on a ten point scale. Attire is assigned alphabetic codes (formal and casual), although numeric codes are used in certain embodiments. Zip codes are used as neighborhood values in this example. The hours of operations is assigned a code selected from a predetermined library of operational hours and in other embodiments the hours of operation is provided various fields, one for each day of the week.

Figures 5, 6:
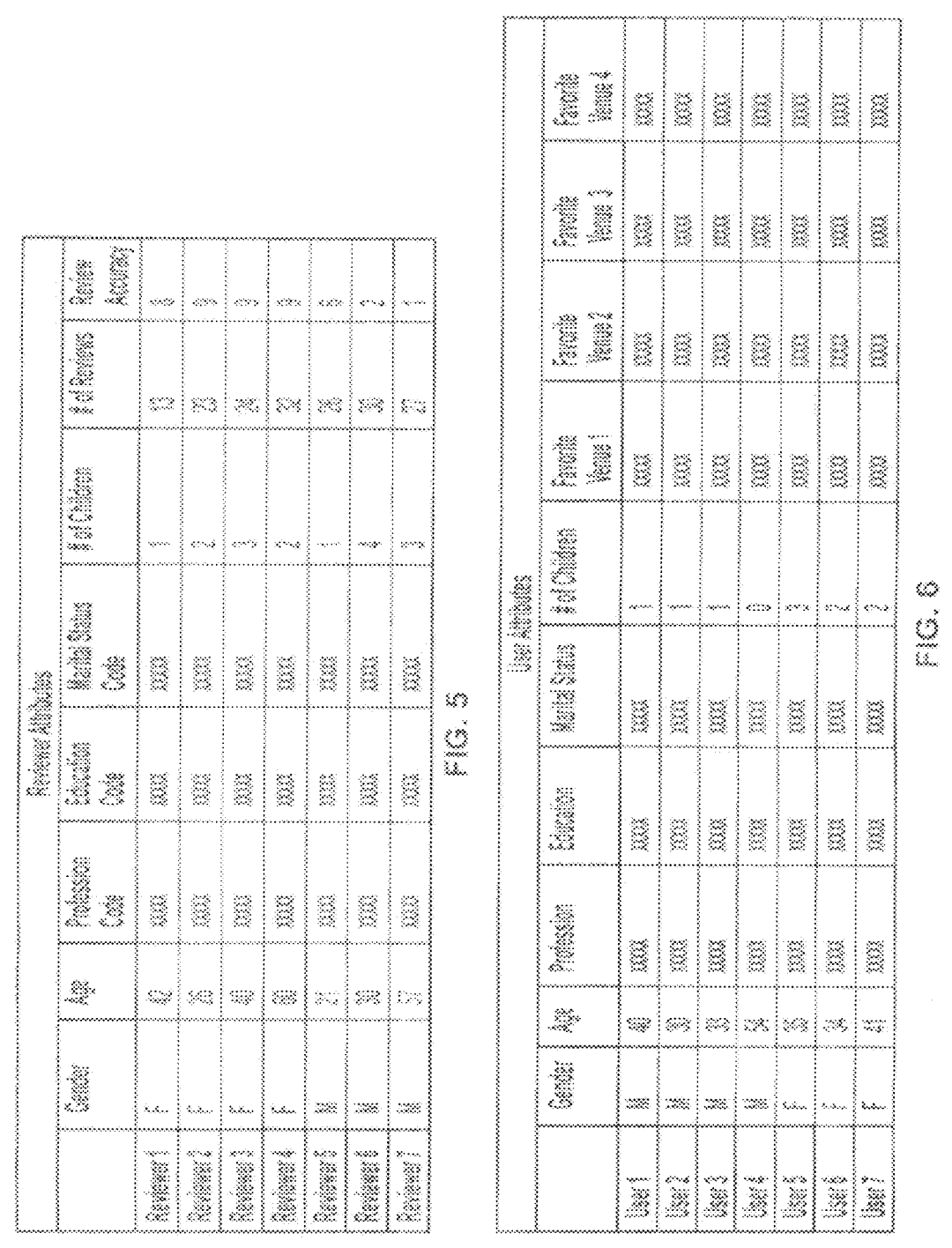

FIG. 5 shows the reviewer attributes for Reviewers 1-7, as shown in FIG. 3. In this example, reviewer attributes are limited to gender, age, profession, education, marital status, number of children, number of reviews, and review accuracy. The codes may be selected from predetermined libraries. The number of reviews is based on the data collected as described above. The review accuracy may be calculated based on the feedback control data as discussed above. Alternatively, a composite reviewer grade may be used which optionally factors in number of reviews, citations of reviews on other sites, number sites hosting reviews and/or consistency of recommendation with positive user feedback.

FIG. 6 is a chart showing an array of user attributes for seven users. The methodology is similar to that set forth above for reviewers but additional or different data fields are used for the users. In this embodiment, each user is asked for four favorite venues. In other embodiments, a list of preferred venues in various different venue categories is included in the user profile. This user data, as noted above, may be input by each user and/or collected from web data sources in the manner set forth above.

Figure 7A:
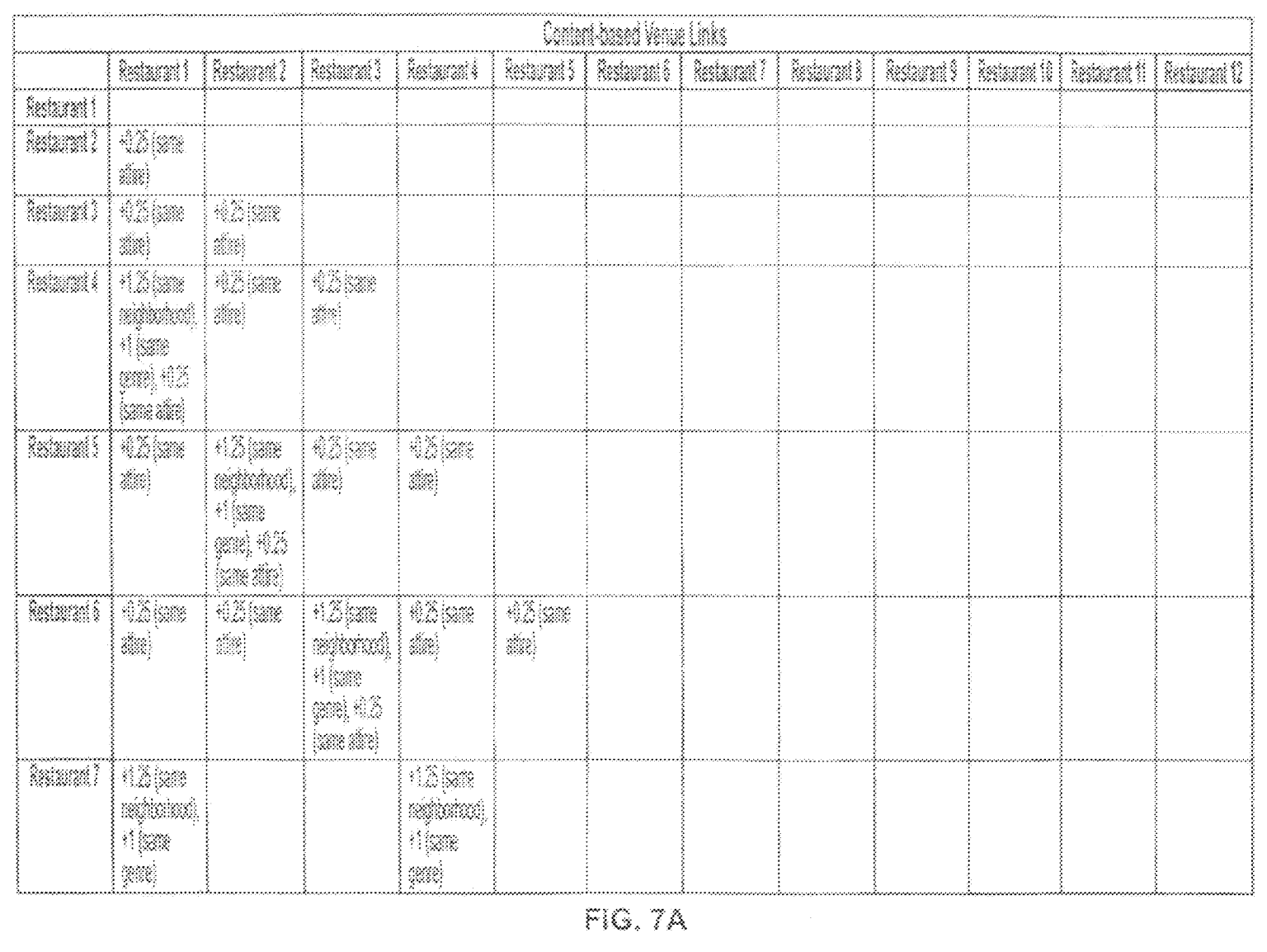

FIG. 7 is an array of content-based venue links based on the venue attributes of FIG. 4. Restaurant 4 has one link with Restaurant 2 associated with common attire. The value of the link, +0.25, is less than the other links such that it has a lesser impact on the recommendation, as will be seen. In other words, the link is relatively weak. Restaurant 4 has three links with Restaurant 1, +1.25 associated with the common neighborhood, +1 based on the common genre and +0.25 based on the same attire. The net value of the content-based links between links Restaurant 4 and Restaurant 1 is +2.50. This matrix could optionally include links associated with a plurality of additional venue attributes and could also include anti-links, or negative links, associated with anti-common properties as will be illustrated in connection with FIG. 8.

Figure 8A:
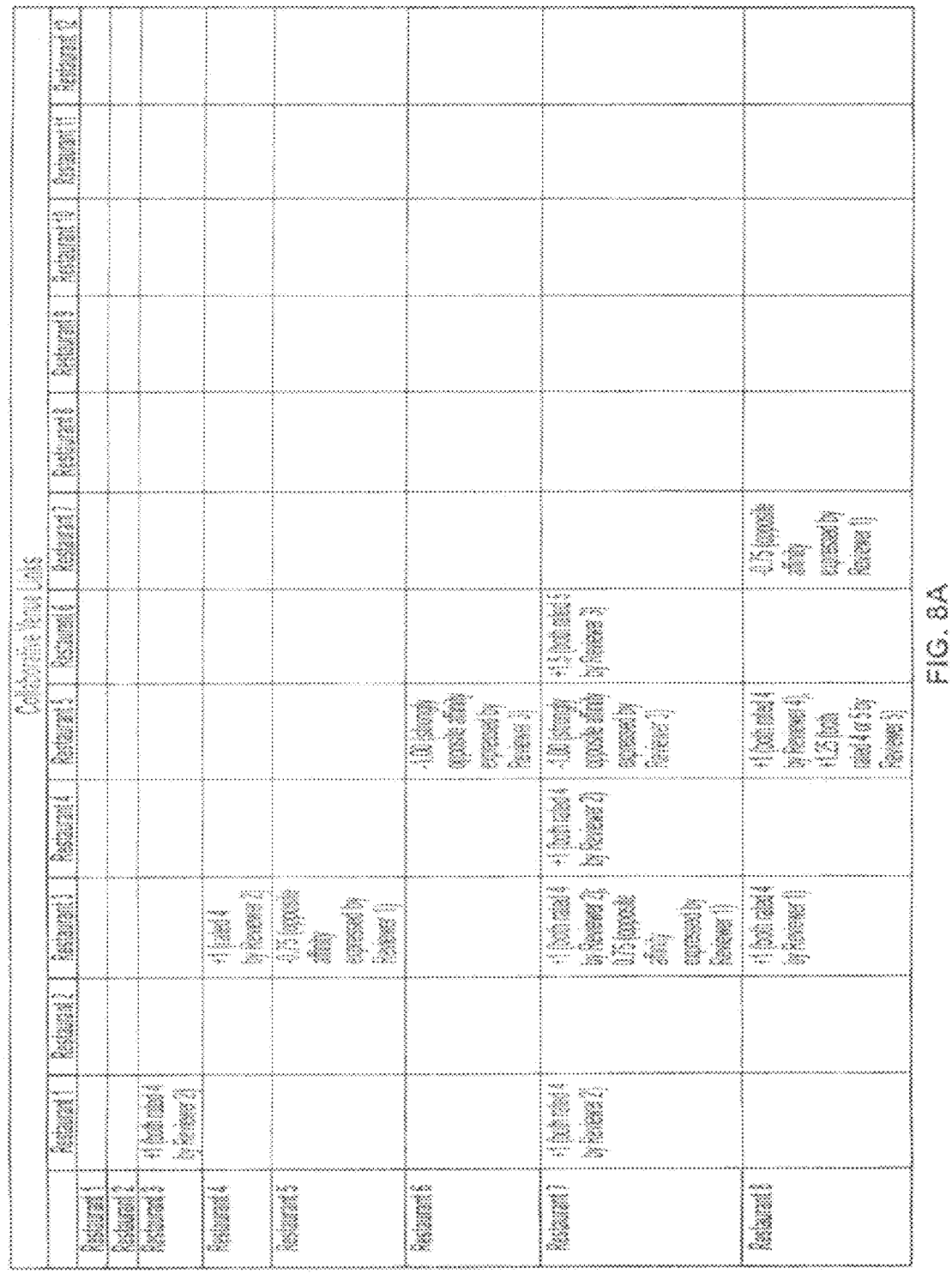
FIGS. 8A and 8B show a matrix of collaborative venue link according to one example.
Figure 8B:
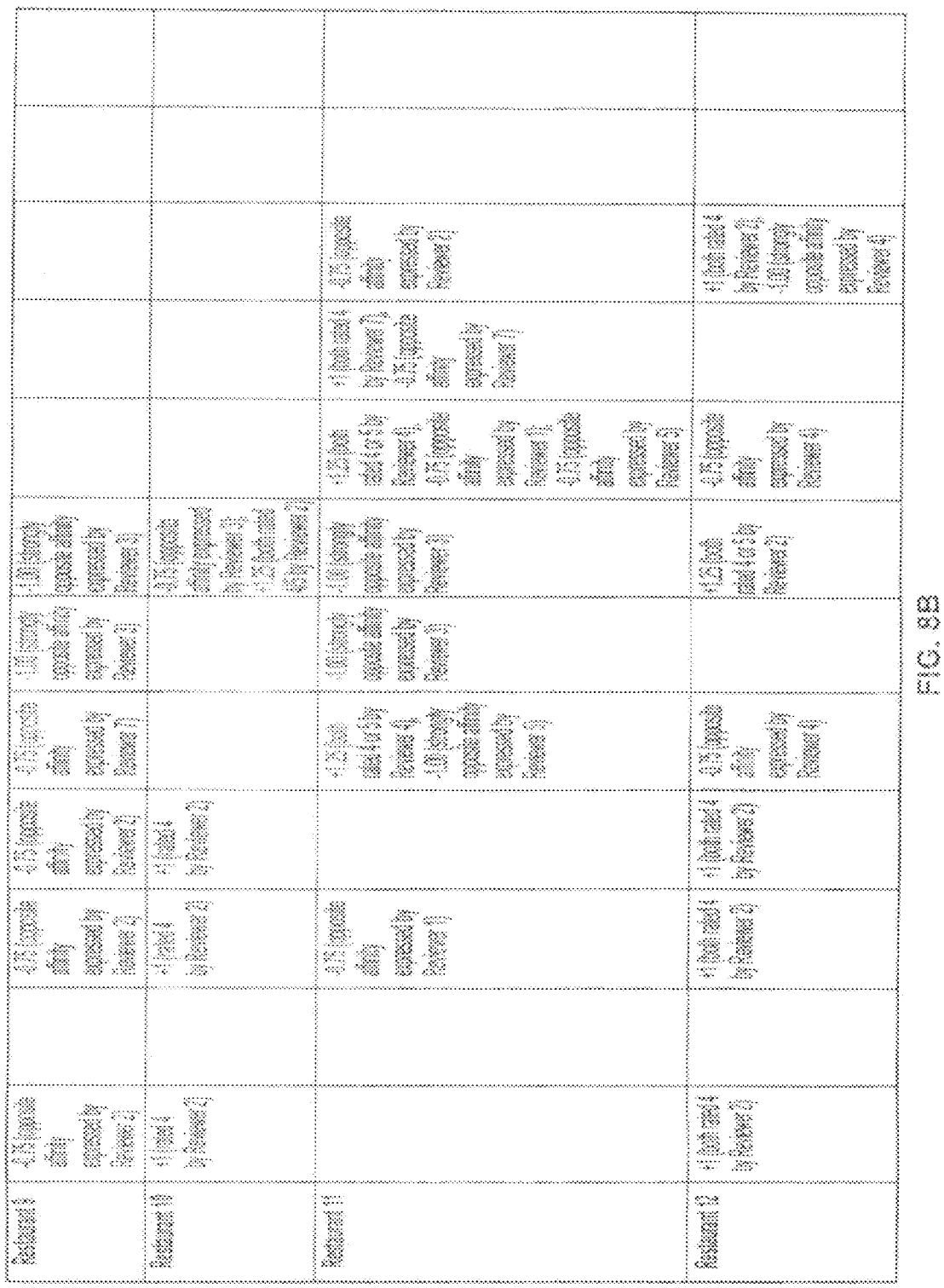

FIG. 8 is a matrix of collaborative venue links based on the reviews set forth in FIG. 3. Taking as an example the association between Restaurant 7 and Restaurant 3, there is a +1 link associated with the fact that Reviewer 2 rated both of these restaurants as four star. Restaurants 6 and 7 are given a stronger positive link based on common positive reviews because Reviewer 3 rated both restaurants as five star. Returning to the link between Restaurant 7 and 3, an anti-link of −0.75 is assigned based on the opposite affinity for these restaurants expressed by Reviewer 1 (who gave the Restaurant 3 four stars and Restaurant 7 one star). A higher negative magnitude could be used where a review rated restaurants in a more strongly opposite manner (i.e. one star and five star) as shown in the link between Restaurant 11 and Restaurant 5. There a −1.00 anti-link is shown based on the one star/five star ratings of Reviewer 5. As noted above, a greater array of different links could be assigned based on commonalities or anti-commonalities—these are merely representative.

A matrix of content-collaborative interrelationships (not shown) may reflect links arising from common or anti-common features between each venue and each reviewer. For example, reviewers may have a characteristic called "genre affinity" and when that matches the venue genre a link of predetermined strength may be created. Additionally, the content-collaborative matrix may show links between affinity for a venue and reviewer attributes. In that example, common attributes among reviewers who rated a venue highly are linked to the venue. For instance, reviewers aged 31-35 may disproportionately rate a venue poorly, in which case an anti-link is created between the venue and the reviewer attribute "age 31-35."

FIG. 9 shows illustrative outputs of the recommendation engine based on a query for a recommendation for an American restaurant and a user affinity for Restaurant 7 (taken from the subject user's profile of FIG. 6). In other embodiments more inputs may be used, such as venue attributes and other preferred venues. In this example the recommendation is a blending of the content-based link strength 901, collaborative link strength 903, and content-collaborative link strength 905. Each link strength is assigned a distinct weighting factor 902, 904, 906, although in other embodiments the blending equation is a second order or higher order equation rather than a first order sum of products. The values 910-914 derives from the fact that Restaurant 3 and Restaurant 7 have no link shown in FIG. 7. The same is true for Restaurant 6/7, while Restaurants 9/7 and 12/7 show a +0.25 link. Similarly, the matrix in FIG. 9 shows the cumulative link strengths 915-918 for restaurant links 3/7, 6/7, 9/7 and 12/7, respectively. The content-collaborative link strength are based an the content-collaborative link matrix (not shown). The weighting factors 902, 904, 906 are constant but may be set to vary according to the predictiveness or accuracy of each type of link (based on feedback control as discussed above). The resulting recommendation values 920-923 reflect the overall link strength 907 between each restaurant and restaurant 7 as shown above. Second order relationships could also be included in the link matrices used to calculate overall link strength. For example, Restaurant 8 is liked by both Reviewer 4 and Reviewer 5. Those reviewers, in turn, both like Restaurant 5. Restaurant 5 could be assigned a direct +0.25 link to Restaurant 8 based on this second order relationship. That link could operate in the matrix independently of the nodes associated with Reviewer 4 or Reviewer 5.

Figure 10:
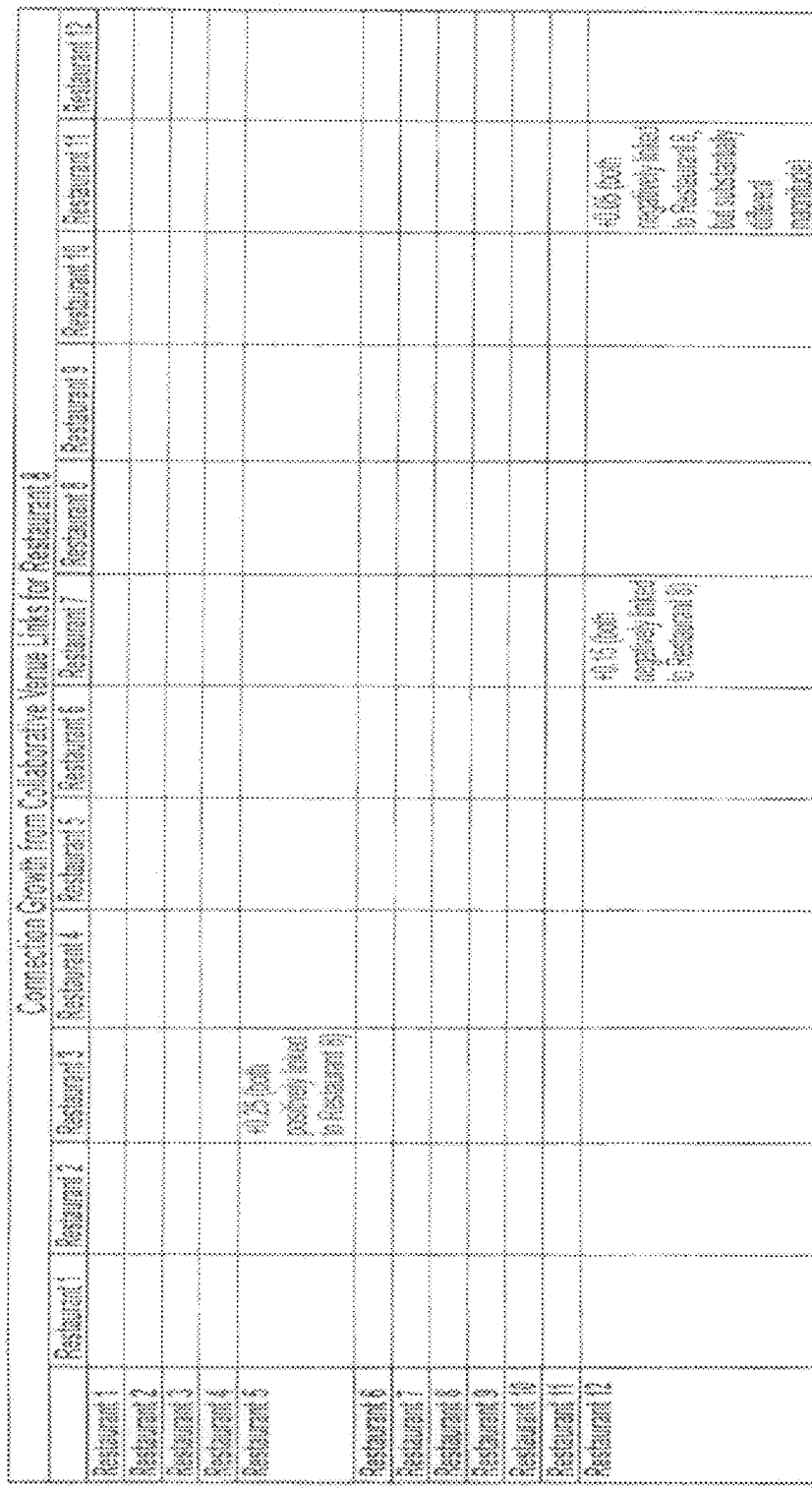
FIG. 10 is a chart illustrating a connection grown according to one example.

An alternative form of second order relationship is shown in FIG. 10. FIG. 10 illustrates second order links arising, from collaborative venue links. As shown in FIG. 8, Restaurant 8 is positively linked to both Restaurant 3 and Restaurant 5, so a +0.25 link is created directly between Restaurants 3 and 5. Restaurants 12 and 7 are both negatively linked to Restaurant 8 so a +0.15 link is created to reflect the belief that this anti-link is weaker than the positive link previously mentioned. In a similar vein, an even weaker second order link is established between Restaurants 11 and 12 because while both are negatively linked to Restaurant 8 the links are substantially different in magnitude.

These second order relationships can be added directly to the related matrices or otherwise computationally combined when calculating overall link strength between two nodes.

Figure 11:
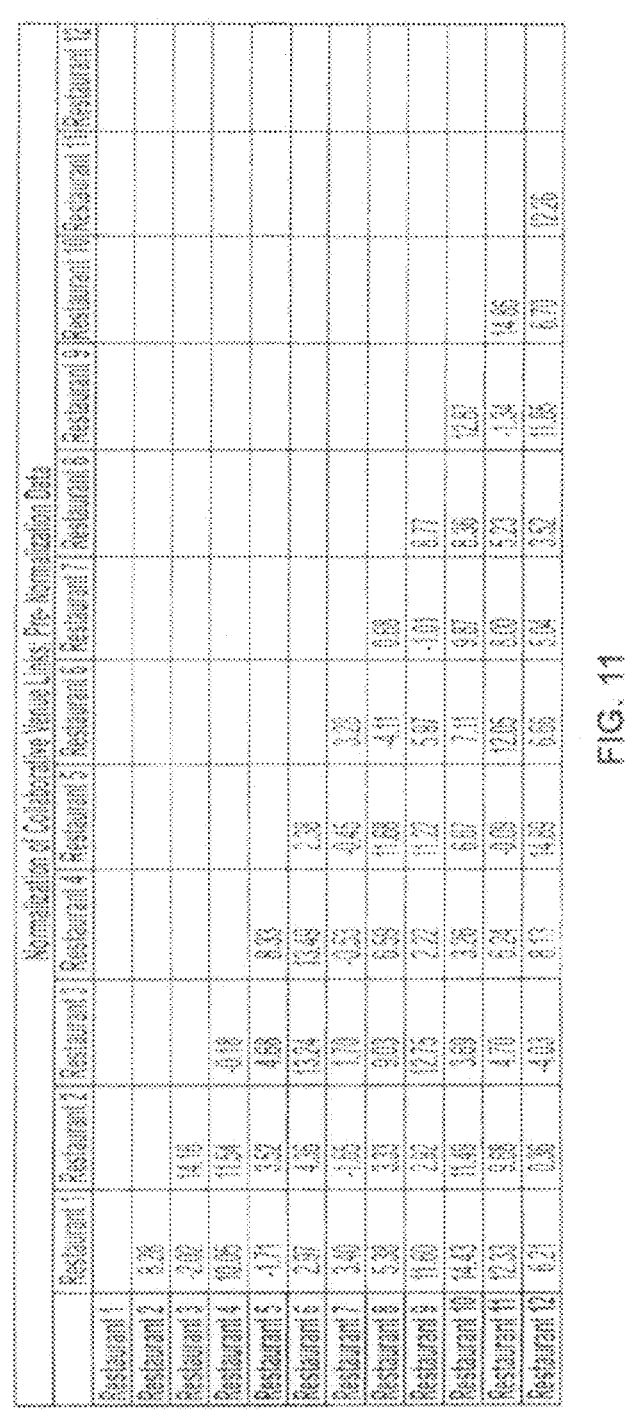

FIG. 11 shows an arbitrary set of link values in a more complex system that factors in a wider variety of links (such as second order links) across the same nodes. It can be seen that the values are strongly positive and few values are negative. This can be observed where the data has a skew associated with reviewer tendency to give generous ratings, for instance. If the data of FIG. 11 is content based it may have a skew different than parallel matrices for collaborative links or content-collaborative links. Accordingly, it may be useful to normalize the data of FIG. 11 to facilitate computational combination with links in the other matrices.

Figure 12:
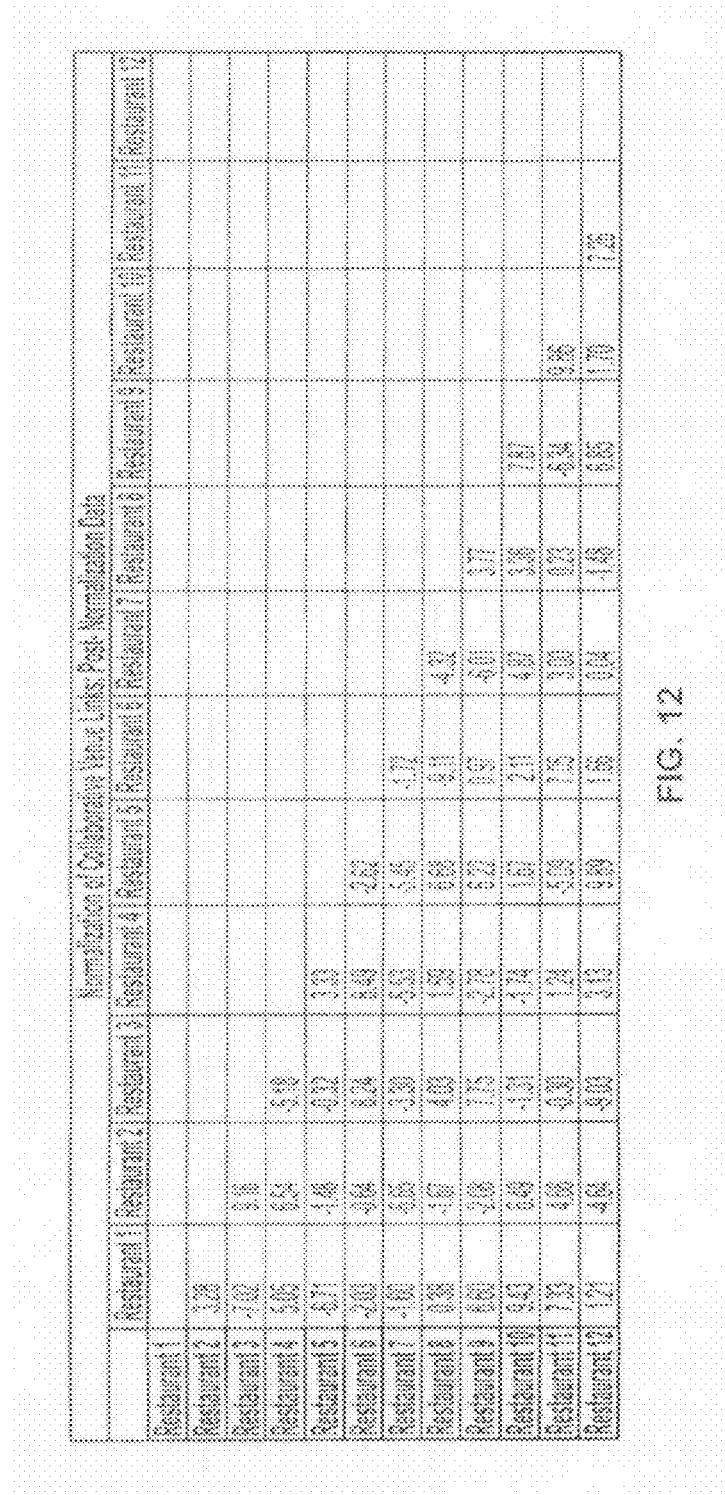
FIG. 12 is a chart illustrating post-normalization matrix data according to a second example.

FIG. 12 shows the data after an exemplary correction operation. In this example, a constant value of five was subtracted from all data points. In other embodiments, the value subtracted may be selected such that the data set hits a common or desired mean or median.

In other embodiments normalization is accomplished by multiplication or division, For example, a certain percentage may be subtracted like a tax from affected links by multiplying the link strengths by (1-X), wherein X is a tax rate from 0 to 1. The tax rates in this approach may be progressive to accommodate the tendency of users and reviewers to aggregate toward a small number of more popular venues, which as discussed herein can cause those venues to cast too large a shadow or have an undue influence on the remainder of the neural network.

It should be noted that normalization can occur at local level or at the network level. At the local level, all links connected to a certain nodes may be normalized or all links coming to or going from a certain node may be normalized (recalling that links may be unidirectional or asymmetric). Alternatively, normalization may occur at the data matrix level. For example, content-based link matrices may be normalized or other data subsets of network may be normalized.

Figure 13:
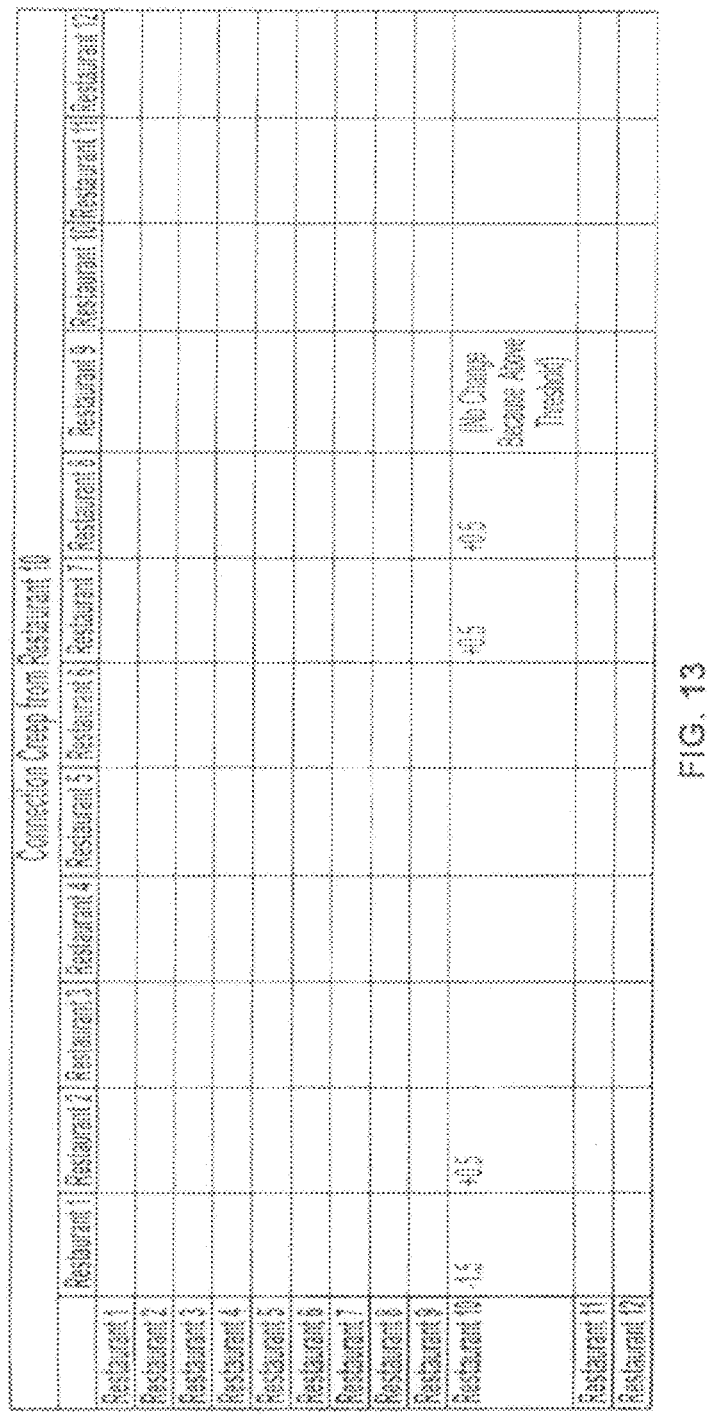
FIG. 13 is a chart illustrating connection creep according to a second example.

FIG. 13 shows another form of higher order connection, connection creep. In this example the link between Restaurant 10 and Restaurant 1 in FIG. 12 is considered too high in that it might have an undue influence on the connected nodes. Accordingly, 1.5 of link strength is subtracted from link 10/1 and 0.5 is added to the less strongly positive links 10/2, 10/7 and 10/8. No portion of link 10/1's strength is reassigned to link 10/9 because it is already above a predetermined threshold above which links are not to have connection creep bonuses added or above which no higher order links should be added.

User Interface

Figure 14:
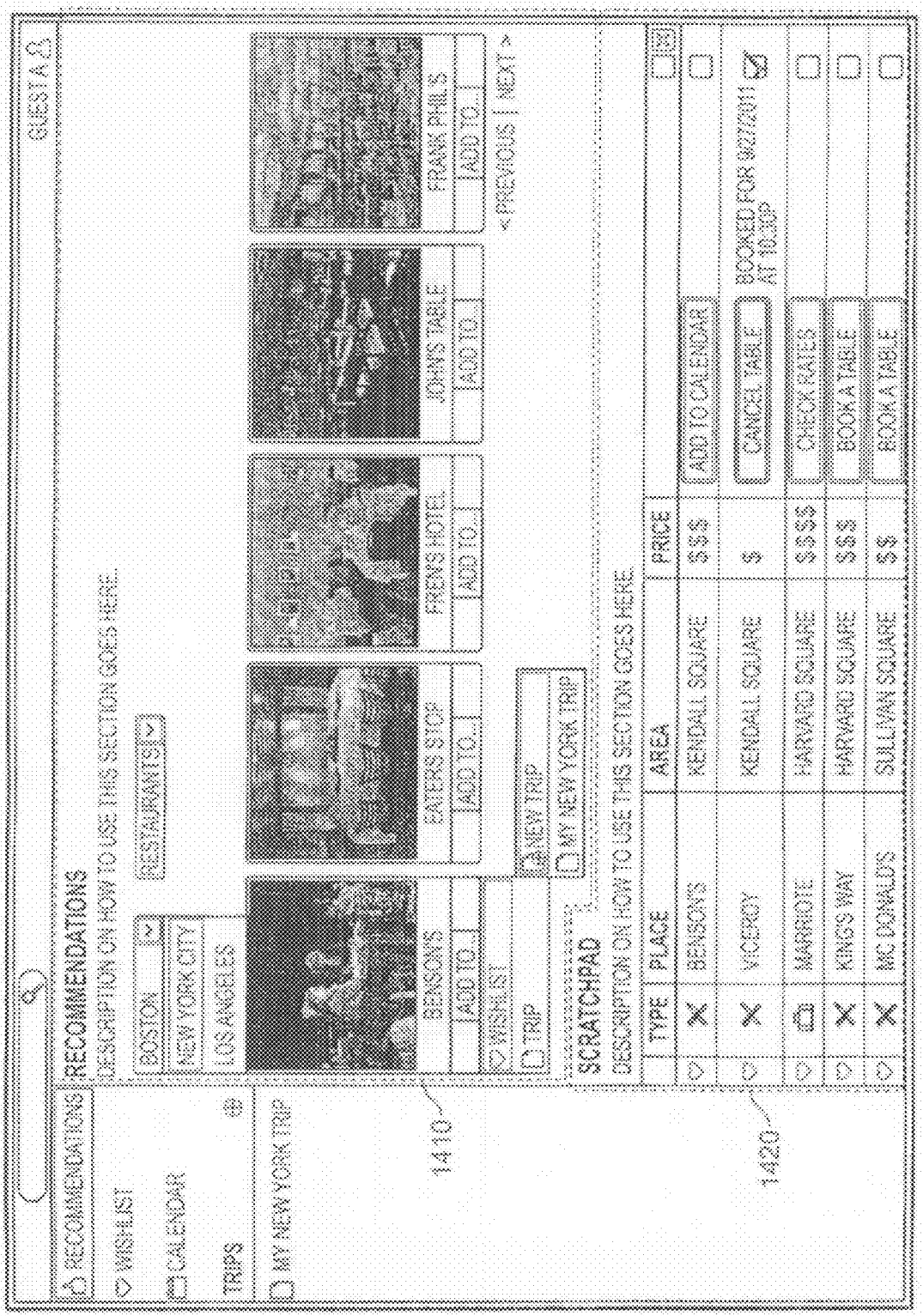
FIG. 14 is a user interface according to one example.

FIG. 14 is an exemplary user interface for deployment at a web portal or client device such as a desktop computer, smart phone, tablet PC, automotive multimedia interface or other mobile computing device. The server or local application provides an evolving personalized brand logo and personalized audio soundtrack to match the displayed itinerary. The sound track may persist and "travel" with the user as he or she navigates different functionalities or pages through the interface. The interface is also designed to provide bio-visual data feedback to the user. The system permits users to state their goals and intentions based on the feedback they have received from the system.

FIG. 14 is an overview page that provides users with an immediate perspective on options, a space for collection/comparison/pre-screening/deliberation, and the ability to immediately act. Specifically, the overview page has three distinct sections and functionalities.

First, at the recommendation panel 1410, a plurality of recommendations are presented. In preferred embodiments, there are five recommendations provided as shown in FIG. 14. In other embodiments, two to seven, three to six, four to six, four to eight, four to nine, or two to ten recommendations are provided. The number of recommendations may be on a per-venue basis so that five recommendations are provided for restaurants and a like number of hotels are recommended. Alternatively, a lesser number of complementary venue (e.g. hotel) recommendations are provided.

Second, the collection and comparison panel 1420 provides a place to compare and contrast recommendations of interest. The panel provides venue genre or type, the venue name, geographic area, and price. The panel also provides buttons to book a reservation or check availabilities or rates for the various venues. Buttons for adding the event to the Ava calendar (discussed below) are optionally provided adjacent each venue. Also provided are status identifiers indicating the current state of activities and/or bookings for each venue. Optionally, buttons may be provided to launch a window or image that depicts the venue on a map.

Third, the calendar panel (not shown) will feed or import a view of the user's personal Ava calendar and provide interactivity for immediate assessment of the user's schedule and available times. The calendar permits import of the user's other appointments and export of the Ava calendar items to any third party calendar systems such as Outlook, Google, and iCal.

These three panels are arranged down the page so that decision-making flows down the page from menu of options (top), to deliberation and comparison (middle), to arriving at a decision, and finally to scheduling/booking/publishing/sharing/taking action (bottom). This arrangement may in certain embodiments facilitate decision-making.

A user can directly book a recommendation at any of these three stages, or add to calendar at either of the first two stages. This arrangement may in certain embodiments enhance the likelihood that a user makes reservation or booking based on the recommendations.

Additional optional functionalities (not shown) include a transportation reservation interface. For example, the interface may present a transportation button that launches an booking or reservation portal which communicates with a third party transportation provider, such as a taxi service, and makes a reservation corresponding to a restaurant or other reservation. The interface may also permit the arrangement of transportation services between and amongst a plurality of other recommended events spanning one or more days.

In similar vein, booking functionality may be provided for a variety of complementary venues, services or activities. Examples include hotel rooms, airline reservations, movie tickets, theatre tickets, museum tickets, music tickets, sporting events, product delivery (such as flowers or flowers), real estate services, or moving services (such as inter-city packing and transportation services).

The interface may selectively suggest alternative actions or venues based on a first booked venue or action. For instance, the booking of a restaurant reservation may prompt the generation of night club or theater recommendations. As another example, the booking of a real estate tour through a real estate agency may prompt a recommendation for moving services. Subsequent bookings may in turn generate additional recommendations complementary to the most recent booking, the earlier booking, or both.

These follow-on recommendations may be filtered and selected according to the techniques set forth above. In particular, the recommendations may be function of the user's profile, attributes, venue preferences, past booking behavior and/or previous feedback concerning certain venues. For instance, the recommendations may be filtered as set forth above according to the user's most recent reservations and the user's expressed preferences for given venues that are linked to potential secondary or tertiary recommendations.

Recommendations may also be provided based on real-time location information, such as that provided by smartphone GPS data. The system 100 may send an electronic message or alert either including a recommendation based in part on the location and/or time or prompting the user to access an interface to receive the recommendation. For instance, if a user is known to be proximate to a theater shortly before a show which the recommendation engine ranks highly for that particular user the system 100 may generate an electronic alert to the user including the recommendation, a hyperlink to the system web portal, or a link to active a client recommendation application which can launch the interface described herein.

Alerts or recommendations may be accompanied by, and be generated based on, promotional offers related to the venues, For instance, an electronic notification may contain a recommendation along with a promotional discount offer for the related potential booking or reservation. Recommendations presented in the interface (or via electronic messages) may also be selected based in part on promotional status. That is to say, the recommendation engine may strengthen links nodes associated with promotional offers and thus the engine will factor in promotional offers when determining nodes to recommend (i.e. those most strongly linked to nodes associated with the user or a recommendation request).

Users' feedback concerning recommended venues and the associated "take rates" may likewise be factored in by the recommendation engine. For example, the link strengths may be increased for venues for which users more frequently make reservations based on the recommendations, consistent with the techniques taught herein.

Users may be provided a profile page or "my account" page that provides analytics on that data and any other data collected or contributed to provide perspective and insight into behavior. The page provides a feedback mechanisms to the user that is "habit honing" in that analytics on self activity is provided in a visual format. For example, the page may present graphical trends of actions within customizable goal categories such as health (gym, yoga), family (museums, travel, dining), and errands (dentist, mechanic, groceries 1. Based on user defined goals, the overview page suggestions can be featured to highlight relevant activities to fill existing calendar time-slots.

The interface may also provide other prompts to facilitate action and hone habits. For example, the interface may provide cues and triggers embedded in mobile device applications to cue initiation of plans and transitions between scheduled events. For instance, the mobile client application may trigger chimes upon next scheduled event, music to reduce anxiety surrounding errands, tailored music transitions upon the occurrence of the next scheduled event, or visual (blinking LED) cues upon next scheduled events.

The interfaces described herein may be presented, as noted, through a variety of devices. Still additional devices are contemplated, including television screens, third party websites (through partnerships), in-store kiosks, or personal keychains or dongles.

Merchant Interface

The venues are operated by third parties which may comprise merchants such as restaurant owners, airlines, or hotel operators. The system 100 may be configured to provide merchants a visualization of users' behavior. For instance, merchants may be provided access to ant trail data patterns, including in real time. Merchants can "interact" with these patterns and request the system 100 to inject disruptive content such as promotional offers related to a user's present location and expressed preferences.

Merchants may also be provided anonymized profiles of the likes and dislikes of their customers (i.e. users who patronize their establishment). This can include reviews provided by reviewers and users who provide feedback (who also constitute reviewers).

Illustrative Implementation

One illustrative system implementation consistent with the foregoing teachings is discussed below. The discussion is generally organized into four sections: content collection, content organization, personalization and user interface.

The purpose of the Content Collection system is to perform 3 steps: 1) identify "objects" (venues, events, and other instances of interest to the user), 2) find/match electronic pages with deep information on those objects (object characteristics, reviews, associations with other objects), and 3) retrieve pages into the storage system.

The objects to be retrieval in this example constitute any set of web pages based on objects of interest. The objects may be selected based on category, filters for a particular category and the content sources that are targeted.

This type of retrieval can in turn be broken up into several Content Modes. Content Mode 1 is called "Global Grab." In this mode, the system seeks to identify and retrieve information on every object in a category (e.g., "all restaurants in San Diego"). In Content Mode 2, Keeping Current, the system seeks to focus the collection on either i) refreshing stale information on old objects, or ii) Identifying new objects that just arose for old categories. In Content Mode 3, known as Intelligent Browsing, the system seeks to have the data search update itself dynamically based on its real-time discoveries, to "zoom in" and focus on specific trends and objects.

One type of Global Grab is spidering. This is a conventional method used by Internet search engines according to which the system downloads: the page of a content provider's site, scans that page for links to other pages on the site, and then downloads those pages. By repeating this process an entire site can be covered. The system can also implement paginated searches in which the system actively seeks, for example, page 1 of a term like "Restaurants," then page 2, and so on.

A second type of Global Grab is crawling. Sometimes it is desirable not to have to get pages directly from a content site, such as where the site blocks automated indexing. In this case one can replicate the structure of a site from the cache of a search engine, which crawl and cache every page as a "second copy" of the internet. Here, the system uses a search engine to search for the URL of interest. Usually, the URL will be included in the first result, along with a "Cached Page" link to the cached copy of the page. The system can then download the link listed in the "Cached Page," which is the same as the original page. The system can then scan that page for links to other pages on the site, and repeat the process for those pages.

A third type of Global Grab involves getting a list of all objects and then finding them within a site. This is a method designed to be more holistic than spidering, to ensure that every single object of a category is retrieved from a given site if available. First, a complete list of target objects is created, such as by crawling an Internet directory like Yellowpages.com for "restaurants in San Diego." Then the system will have the complete list of objects for which data is desired. The next step is to search for each of these objects in turn in a search engine, restricting the search to the pages from the target website. Different combinations of data extracted from the internet directory can be used to seed the search query, and usually the business name, metro name, and phone number are useful ways to lock onto the object on the target site.

The search engine will retrieve pages that match these search query parameters on the target site of interest. Usually one of the first few pages in the results is the correct match. By repeating this search engine and retrieval process for every object in the Internet directory, the system is likely build, a complete replica of the target site's data on that category.

A fourth type of Global Grab involves third-party crawlers. It is contemplated that third party services will crawl the web and make the results of those crawls available for purchase. In this case, the first step of the global grab methodology is simplified because the system can query the service for every page arising from a certain set of websites. If such third party services also make the pages available for retrieval then the speed of the crawl is increased.

Turning to Content Mode 2, Keeping Current, it is assumed that the system has completed a global grab and has data on all objects for a given category. The task then becomes staying current, or up to date, with the objects as their data changes. New objects can be introduced, such as when restaurants open. Old objects can become outdated, such as when restaurants close. Data on objects can change, such as if the hours of operation or menu items change. New and old objects can be identified by doing a crawl on global directories (which is fast) and then focusing in on any changes to the list of objects. Alternatively, the system can discard old data and then run a new global grab. Finally, the system can rely on "update notifications" which can be acquired in several forms: I) some websites focus on these changes, such as "listings of new restaurants" in local papers, ii) many content provider APIs will notify of openings and closings of sites, iii) URLs and webpage titles will often receive a "CLOSED" stamp which can be rapidly screened. Each datum collected by the system is tagged with an expiration date, based on the type of the data (events expire immediately, restaurants may need to be refreshed every few months to check for major changes). Data that has expired can have associated pages re-retrieved for freshness. The re-retrieval process is simplified because the URL is already known.

Content Mode 3, Intelligent Coordinated Retrieval, involves "eating nodes," or retrieval computers, that can coordinate their searches based on real-time events to optimize content gathering in response to mass user behavior. In this implementation the retrieval computers are given "write" access to the retrieval queue. If the retrieval computers identify a trend that is similar to their original target, but stronger, the retrieval computers can recruit other computers to look more deeply at this phenomenon by writing the new target (or a set of targets within a target area) onto the retrieval queue. Retrieval computers can also interact intelligently in the collection process by alerting each others if a lead turns out to be faulty, and is indicative of more faulty leads (for example, if a region of a site is covered with spam or stale data). In this case, the retrieval computer(s) can scan the queue and delete similar jots on the queue so that future computers don't devote resources to exploration of a lower value target area. In this way, different search nodes again inform one another about what they learn by virtue of the shared queue to help guide their collective search, Turning next to matching objects to content pages, whenever the system is gathering data from target websites on an object of interest, the system should ensure that the data on the target site is actually referring to the object of interest. This is especially true when attempting to cross-reference objects across different sites. The system optionally utilizes a "likelihood of match" score to make this determination, taking into account multiple variables. For example, if the system is trying to match a venue on two different sites, the fact that they have the same phone number or address may tend to indicate that they are the same venue. Numeric identifiers on consistent scales are particularly valuable for this purpose, such as phone numbers, UPC symbols, and latitude/longitude. Non-numeric identifiers (strings) such as addresses can also be used, and one can check the similarity of the two sites' addresses by taking a Hamming distance on the characters, or parsing, out each one's street number, street name, etc.

Data is cross-referenced across multiple sites by using data from one site to choose objects to find on another site, then use the steps discussed above to find new content pages from those objects on a different site.

A fleet of retrieval computers may be created by building each from scratch programmatically. Each computer is resurrected from a disk image, such as an Amazon Machine Image (AMI). The AMI is loaded as an elastic computing node on Amazon's EC2 (elastic cloud computing) or other service using standard libraries written in Java. The AMI is armed with everything that the computer will need, including a Java runtime environment, the capacity to communicate with a central version control repository such as Git, etc, The AMI is also armed with a startup script that runs when the EC2 node is born, and receives user parameters passed to the EC2 node at birth. The user parameters to the startup script tell it where to download the latest code instructions for the node, such as the URL of an S3 location, or the URL of a Git repository. The startup script is armed with the credentials to access the latest code instructions, and load the code onto the new EC2 node. Every EC2 node in the fleet downloads similar instructions, so they are all prepped around a common task. These instructions tell it how to connect to the message queue with the URLs to retrieve, and also how to go about the retrieval process. Each one then launches the downloaded code (runs the JAR file, etc) and thus begins working. Finally, each computer in the fleet is assigned its own IP address (via Amazon's Elastic IP system, etc) so that they can be throttled by content sites independently from the other nodes and work in parallel.

Tasks are distributed amongst the fleet of retrieval computers by using a list of URLs (usually long, millions) of pages that the system wants to retrieve. This list might be a text file, database table, or other simple serial storage system. The goal is to distribute those URLs among the many computers. This process is best implemented through a queue service that lives independently from all the retrieval computers. As an example, Amazon offers the Simple Queuing Service (SQS) in which every URL is stored as a string message on the queue. Thus, the queue retains a memory of which URLs still are to be crawled. Each computer in the fleet can query the queue for the next item to be crawled. The queue then assigns the item to a particular retrieval computer, and marks the item as "locked" so that other retrieval computers do not also try to work on the item. Meanwhile, the system monitors whether the retrieval computer completes the task in a timely manner. If the retrieval computer does not check back with the queue to say that the job is done, then the queue restores the item to "unlocked" so that other computers can perform the task. Once a computer checks back with the queue and informs it that the task has been completed the queue removes the item from the queue. Thus, a workflow is established that can be shared between an arbitrary number of retrieval computers where they can operate simultaneously to work through a list of retrieval tasks.

Pages are retrieved by all computers in the fleet. Each retrieval computer is already armed with a URL to retrieve by taking the message from the messaging queue. The computer then executes a function to stream the contents of the remote file (webpage, etc) into memory (in PHP, fileget_contents; in Java, urLopenStream( ); etc). The computer then saves this file to the global storage system (see below). With respect to rate of repetition, it should be noted that no single computer hits a given content source too rapidly. Therefore, each computer is "throttled" to only complete one page request every 0.1-10 seconds. The use of third party crawlers, discussed above, may obviate the need to throttle in this manner. Every page request is checked to determine if it succeeded, and if failure occurs, a longer interval is used before the next attempt. The system can implement different schedules for the interval rollback, such as an exponential rollback.

The global storage system may be a distributed storage platform (Amazon 53, etc). In the case of Amazon S3, data is stored in buckets that are accessible from any computer as a URL. Each retrieval computer stores the contents of the retrieved file in a repository folder on S3 (or other service) as a file path string which is also URL. The file can thus be retrieved at a later date by entering the storage system URL. Access to these repository folders are private so that they can only be accessed by the system's Content Collection and Content Organization systems.

Turning now to content organization, the aim is to take content collected from the Internet and organize it for access through the Interface. The input may be a hard drive directory of the latest set of collected web pages. The output may be the data uploaded to a large-scale (but highly organized) database. The output may be generated by repeating the following process: 1) find a page, 2) parse the page for info, 3) match the page to an object in the database, and 4) update the database.

Another computer fleet may be deployed to organize the content. As noted above in the case of retrieval computers, content organization computers may be replicated by building them from scratch programmatically. Each computer is resurrected from a disk image, such as an Amazon Machine Image (AMI). The AMI is loaded as an elastic computing node on Amazon's EC2 (elastic cloud computing) or other service using standard libraries written in Java. The AMI is armed with everything that the computer will need, including a Java runtime environment, the capacity to communicate with a central version control repository such as Git, etc. The AMI is also armed with a startup script that runs when the EC2 node is born, and receives user parameters passed to the EC2 node at birth. The user parameters to the startup script tell it where to download the latest code instructions for the node, such as the URL of an S3 location, or the URL of a Git repository. The startup script is armed with the credentials to access the latest code instructions, and load the code onto the new EC2 node. Every EC2 node in the fleet downloads similar instructions, so they are all prepped around a common task.

Every computer in the Content Organization fleet receives 2 pieces of information (which it is programmed to seek out using in its boot instructions): 1) the storage space location of the code instructions to be its brain, 2) the location address of the job queue where it will receive the material to be processed. The system controls the Content Organization fleet by creating, and managing the content organization process. The system defines the storage directory of all the pages that need to be organized. The system thus turns this directory into a list of jobs, where each job is a file to be processed. The system then creates a task queue (see below), loads that queue up with the tasks, and sets the properties of the queue to determine the time allotted for task completion before tasks are recalled and given to other computers.

The task queue may be implemented using Amazon Simple Queue Service (SOS) or some other service that is external to individual computers. The system loads up the job queue with a list of pages that need to be organized. Each item in the queue is a URL address in global storage space to a page that needs to be organized. The goal is to distribute those URLs among the many computers. The queue allows computers to take URLs, and retains a memory of which URLs still must be organized. Each computer in the fleet can query the queue for the next item to be crawled. The queue then assigns the item to the computer, and marks the item as "locked" so that other computers do not also try to work on the item. Meanwhile, the system monitors the queue to determine whether the computer completes the task in a timely manner. If the computer does not indicate to the queue that the task is done within the allotted time the queue restores the item to "unlocked" so that other computers can take the task. Once a computer checks back with the queue to say that it has completed the task, the queue removes the task from the queue. Thus, a workflow is established that can be shared between an arbitrary number of computers where they can operate simultaneously to work through a list of retrieval tasks.

The global storage system for the Content Collection fleet may be a distributed storage platform (Amazon S3, etc.). In the case a Amazon S3, data is stored in buckets that are accessible from any computer as a URL. Each retrieval computer stores the contents of the retrieved file in a repository folder on S3 (or other service) as a filepath string which is also URL. The file can thus be retrieved at a later date by entering the storage system URL. Access to these repository folders is restricted so that they can only be accessed by the system's Content Collection, and Content Organization systems.

The system may utilize the following global structure for document namespaces: date_retrieved/data_format/content_providericity/categord. For example: 2011-07-07/xml/google/boston/restaurants/. However, depending on the source of the crawl, the raw data files may not even be organized into this directory structure yet. In this case the crawl results should be sorted into files that are organized according to this structure.

To sorting raw crawl results, the system first inspects all the files retrieved during Content Collection and sort them according to the objects that they represent. One way to do so is inspect the URL of the crawl. The URL will disclose the content provider, the city/metro area, and category. For sites where this cannot be computed from the URL, the data can be extracted from elsewhere in the file (address field, etc.) The date of the crawl can be retrieved from the stored file's metadata. The crawl result file (or part of the crawl result file) that applies to the extracted object can then be saved in the directory structure described above. In this manner, all of the raw crawl results are placed in an organized directory structure to facilitate the subsequent organization to the database.

The queue is loaded by accessing the storage system directory where the sorted documents are located (see above). The system then spiders this directory to uncover the list of all files within that directory and its sub-directories. The system then creates a job queue (described above) to hold the list of files to parse. Next, the system uploads to the queue a list of file locations (URLs to the files), as an array of messages, to the queue. At this point the queue is loaded with a set of files to be parsed and organized.

Every time a computer in the fleet goes to the queue and retrieves a sorted page to organize, it first analyzes the following information from the URL: the "data format", which determines how to read the file's data; the "content provider", which determines which page parser to apply; and the "category", which determines what type of object to extract. The computer already has in its memory all of the different parsers that it downloaded when it was deployed. The computer picks one out based on the content provider and data format, and runs it on the file. Input is the file itself and the output is a data object in memory with values extracted from the file and stored in fields.

Every time a computer parses a file, and stores its data object in memory, the data is next added to the database. First, the computer has to identify the object's location in the database. This is accomplished by selecting the database table (in Amazon, a domain) based on the category of the object, and locating the row of the object by using, in descending order: i) the unique id of the object from the content provider (for example, restaurant id on local.yahoo.com), ii) another unique numerical identifier, such as the phone number, and iii) name, address, and latitude/longitude fuzzy matching. If the determined entry does not already exist, the computer creates a new row. The computer then runs an update on that row, updating every attribute (field) in a single database hit for efficiency. This is repeated for every sorted page that the computers come across in the queue, until all of the sorted pages have been organized into the database.

Next, the system personalizes the content by generating a neural network architecture that connects objects in the world as nodes within a network. The system activates a subset of the nodes based on what is known about the user's affinities. The activations are followed through the network to deduce what else the user will like.

The neural network may be implemented as follows. Connections TO a node a stored as a list of {N1, W1, N2, W2, . . . } where the connected nodes N are paired with their weights W. This list is saved in the database in the same row as the other properties of the node. Optionally, a list of connections FROM the node can also be stored. Subsets of nodes to be activated are identified by user-provided data regarding likes and dislikes. Users may be required to answer regarding their "favorites" in different categories. Users may also provide feedback on recommendations that they are given, which can be either binary (approve or disapprove) or they can be continuous (e.g., 1 to 10, or −10 to 10). The system assembles a list of "positive activation nodes" and assign an activation level, which were either favorites (e.g., 10× activation) or feedback-driven (e.g., 1-10× activation). Similarly, the system assembles a list of "negative activation nodes" and assigns an activation level (e.g., −1× to −10×).

Connections are established by, for every node in the user's list, accessing in the database the set of common co-occurrences with that object on the web. The system retrieves this list of objects and builds connections from our node to those objects with five positive synapses each.

Connections also may be based on feature similarity. For every node in the user's list, the system identifies nodes with similar properties. For the category to be matched, the system takes the most salient properties (e.g., for a restaurant, price, cuisine and ambiance) and searches the database for other restaurants that match that feature set. Each match generates two positive synapses.

Connections also may be established based on cross-visitation. For every node in the user's list, the system identifies nodes that have been cross-visited by other users. These users can be users of the system (e.g., users of a subscription service associated with the system) or activity elsewhere on the Internet about which the system has data. This may be accomplished by indexing the reviews and responses to all nodes. The system identifies strong responses to the node of interest, identifies the users that furnished those responses, and identifies other nodes to which those users had similarly strong responses. The system can connect those nodes to our node of interest, with one positive synapse for every similar response.

Negative synapses can facilitate the recommendation process by factoring in what the user does not like and the things that are not like things that the user does like. Both of these associates involve negative synapses, which add richness to the representation. For example, the system can identify strong responses to the node of interest, identify users that made those responses, and identify other nodes to which those users had opposite strong responses. Alternatively, the system can identify nodes that the user did not like, identify other people who did not like that node, identify nodes that those people did like and positively link those nodes to our user's preferences.

Sometimes the network may exhibit "runaway connectivity" where something gets more connected, which then gives it an advantage in getting further connected (e.g., more co-occurrences) which in turn tends to generate even further connections. Therefore the system may normalize connectivity by inspecting the list of existing connections to a node, determining their total value (e.g., # connections N×average weight W), and in the event that total value exceeds some threshold, divide all of the connection weights by a constant value to bring them back into range. This may be repeated for all nodes. Normalization alternatively can be accomplished by dividing based on the N*W term going TO the node, dividing based on the N*W term coming FROM the node, dividing by the total N*W term across the network. The implementation for this may involve reading the list of node weights in the database, performing the normalization on those weights, and writing the new weights back to the database.

The addition of a new synapse connecting nodes can also immediately impact other connections. Upon adding the connection to the list, the other connections to that node can be "taxed" by an amount equal to the inverse of their proportion of the new connection's strength—that is, adding a +1 synapse then taxes the other 10 synapses already on that node by $\frac{1}{10}$=0.1. When synapses become so weak that they are below a certain threshold (either through interaction taxing or through normalization), then they are removed (deleted from the list).

Connections from node to node can be constantly analyzed, updated and consolidated to take into account patterns that emerge between nodes. As a simple example, if A forms a strong link to B, and A forms a strong link to C, then a connection can be consolidated linking B and C. Such patterns can be searched for using specialized scripts that check the database entries for such patterns, and then write back consolidation changes to the affected nodes' lists.

The result of all of these processes is a rich information base that accurately links a huge variety of nodes to a user's established nodes of interest, with a significant dynamic range, and with substantial retrieval efficiency.

To retrieve the list of nodes related to a user, the system need only then "activate" the user's established nodes, and follow their connections to retrieve more nodes that if connected sufficiently strongly will also activate, and depending on the initial activation strength follow those connections to further nodes until the activation peters out with each connection hop depending on the connection strength. The connection strength is therefore the inverse of the resistance to the propagation of the activation through the network.

The total list of nodes that was effectively activated by this process (recommendation set) can then be stored in a list that is linked to the user in the database, for retrieval with a single database call whereupon the list can be cross-referenced against a set of presented results. Optionally, different sub-lists can be stored for different categories, or different presentation scenarios, caching the results for fast personalization.

The user interface may comprise i) a set of HTML files that define the look and feel of the web interface, with design elements styled using cascading style sheets (CSS), ii) a server-side set of scripts that dynamically generate those HTML files using a backend scripting language (PHP, etc) running on a web server (Apache, etc.), iii) a client-side set of scripts and interface libraries that allows rich user interaction within the browser (Javascript, jQuery, etc.), and iv) a backend database that provides the data to the web application (Amazon SimpleDB, etc.).

The functionality of the user interface includes permitting the user to create an account and log in using secure credentials that are verified against an encrypted user table in our backend database. The interface also allows a user to browse objects and see whether they are recommended or not. The interface allows a user to filter those objects by city, by category, and then by a host of properties pertinent to those categories. The user can enter feedback on their recommendations by clicking on thumbs up/thumbs down or other feedback mechanisms. The interface allows a user to drag and drop recommendations onto a "being considered" area where they can be compared across different parameters using sortable headers, etc. The interface allows a user to drag an object onto their calendar in order to "action" it by going to the object at a certain time. The interface allows a user to build events, such as "My New York City Trip" where the user can create a group of restaurants, hotels, and other opportunities that have been recommended. The user can enter notes about their recommendations to remind themselves of various impressions, for example. The user can print out a copy of itineraries for their events, or email those itineraries to themselves. Their calendar is also synchronized with the global calendar on their smart phones, etc. The user can share their recommendations with others, or build events and share those with others.

The interface may be delivered via a scalable cloud architecture. Web servers run as Linux CPU nodes on Amazon's elastic cloud computing (EC2) system. Web servers receive independent IP addresses using Elastic IP or other IP address mediators. Web servers are monitored for load, and users are dynamically distributed among the servers. Excessive user load trips a threshold which leads to the creation of more EC2 nodes. When user load drops too low, that trips a threshold which leads to the delete of EC2 nodes to save cost.

A list of all recommended objects is pre-computed for the user. When tie user requests objects via the interface, the system simply checks to IDs of those objects prior to presentation to see whether the objects appear on the recommended list or not. In another iteration, the personalization is computed in real time with no pre-cached list of recommended objects. In this example, as objects were going to be presented through the interface, they are run through the personalization engine at that moment to compute if they are recommended or not.

In some examples, the server and/or client device (e.g. desktop computer or smart phone) are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a standalone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for Interaction with a user, the features in some instances are implemented on a computer having a display device such as an LCD (liquid crystal display) monitor or screen for displaying information to the user and, in the case of a desktop computer, a keyboard and a pointing device such as a mouse or a trackball by which the user provides input to the computer.

In various implementations, the client device is a smart phone such as that described in U.S. Pat. No. 7,966,578, entitled "Portable Multifunction Device, Method, and Graphical User Interface for Translating Displayed Content," assigned to Apple, Inc., which is incorporated herein by reference.

The server functionality described above is optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A method comprising:
    scanning, at at least one server, a network of data sources, thereby identifying item data for a plurality of items and review data from a plurality of reviewers for a plurality of the items;
    prioritizing, at the at least one server, the data sources based in part on the strength of correlations between the data sources and predictive values of the review data;
    harvesting, at the at least one server and in an order based on the prioritizing, the item data and the review data from the data sources;
    generating, at the at least one server and based on the harvesting, a data network having nodes corresponding in part to the plurality of items and the plurality of reviewers.

2. The method according to claim 1, wherein the item data includes one or more attributes of the items and the review data reflects an affinity of a plurality of reviewers for the plurality of items.

3. The method according to claim 1, wherein the review data is harvested in part based on rating information from third party web sites.

4. The method according to claim 1, wherein the review data is harvested in part based on a purchase history of one or more users.

5. The method according to claim 1, wherein the review data is harvested in part based on a web browsing history of one or more users.

6. The method according to claim 1, wherein the review data is harvested in part based on a dwell time of one or more users at a location.

7. The method according to claim 1, wherein the predictive value of the review data is determined in part based on data sources having a predetermined number of items.

8. The method according to claim 1, wherein the predictive value of the review data is determined in part based on data sources providing a predetermined amount of reviews per item or reviews per reviewer.

9. The method according to claim 1, wherein the predictive value of the review data is determined in part based on a citation of the same review data on multiple data sources.

10. The method according to claim 1, wherein the predictive value of the review data is determined in part based on an alignment of review data from one data source with review data of one or more other data sources.

11. The method according to claim 1, wherein the harvesting includes in part dynamically generating a plurality of data source crawling modules and dynamically assigning one or more data source crawling modules to different data sources.

12. The method according to claim 11, wherein the data source crawling modules harvest data from the different data sources in an order based on the prioritizing.

13. The method according to claim 11, wherein the data source crawling modules are generated based on a data format of one or more data sources.

14. The method according to claim 1, wherein the harvesting further includes harvesting network link information.

15. The method according to claim 14, wherein the generating further includes generating, based on the harvesting, the data network having nodes corresponding in part to the plurality of items, the plurality of reviewers and the network link information.

* * * * *